(12) United States Patent
Vilaipornsawai et al.

(10) Patent No.: US 11,791,951 B2
(45) Date of Patent: Oct. 17, 2023

(54) MINI-SLOT BASED REPETITION AND FREQUENCY HOPPING

(71) Applicant: Huawei Technologies Co., Ltd., Shenzhen (CN)

(72) Inventors: Usa Vilaipornsawai, Ottawa (CA); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 16/533,036

(22) Filed: Aug. 6, 2019

(65) Prior Publication Data
US 2020/0052827 A1   Feb. 13, 2020

Related U.S. Application Data

(60) Provisional application No. 62/716,799, filed on Aug. 9, 2018.

(51) Int. Cl.
*H04L 1/1867* (2023.01)
*H04W 72/0446* (2023.01)
(Continued)

(52) U.S. Cl.
CPC ............ *H04L 1/189* (2013.01); *H04B 1/713* (2013.01); *H04L 5/0051* (2013.01); *H04L 5/10* (2013.01);
(Continued)

(58) Field of Classification Search
None
See application file for complete search history.

(56) References Cited

U.S. PATENT DOCUMENTS

| | | | |
|---|---|---|---|
| 10,608,697 B2* | 3/2020 | Nammi | .................. H04L 5/006 |
| 2006/0107165 A1* | 5/2006 | Murata | .................. H04L 1/1812 |
| | | | 714/748 |

(Continued)

FOREIGN PATENT DOCUMENTS

| | | |
|---|---|---|
| CN | 101816145 A | 8/2010 |
| CN | 106537835 A | 3/2017 |

(Continued)

OTHER PUBLICATIONS

CMCC,"Discussion on PUCCH repetition",3GPP TSG RAN WG1 Meeting #93 R1-1806366,Busan, Korea, May 21-25, 2018,total 2 pages.

(Continued)

*Primary Examiner* — Adnan Baig
(74) *Attorney, Agent, or Firm* — Slater Matsil, LLP

(57) ABSTRACT

Methods and apparatuses for transmission of k repetitions over a channel are described. Repetition formats for the transmissions include options for slot-based repetition, mini-slot based repetition, intra-slot frequency hopping, inter-slot frequency hopping, data splitting, data switching, and DMRS sharing, among others. In some examples, intra-slot frequency hopping is performed. A first repetition of the k repetitions is sent over the channel, starting from a first symbol within a first slot, and using a first set of frequency resources. A second repetition of the k repetitions is sent over the channel, following the first repetition and starting from a second symbol within the first slot, and using a second set of frequency resources.

17 Claims, 12 Drawing Sheets

(51) Int. Cl.
*H04B 1/713* (2011.01)
*H04L 5/00* (2006.01)
*H04L 5/10* (2006.01)
*H04W 72/23* (2023.01)

(52) U.S. Cl.
CPC ....... *H04W 72/0446* (2013.01); *H04W 72/23* (2023.01)

(56) References Cited

U.S. PATENT DOCUMENTS

| | | | |
|---|---|---|---|
| 2009/0097457 A1 | 4/2009 | Papasakellariou et al. | |
| 2018/0124815 A1 | 5/2018 | Papasakellariou | |
| 2018/0219649 A1 | 8/2018 | Ying et al. | |
| 2020/0022149 A1* | 1/2020 | Beale | H04W 72/1273 |
| 2020/0059332 A1* | 2/2020 | Takeda | H04L 5/0012 |
| 2020/0106557 A1* | 4/2020 | Wong | H04L 1/08 |
| 2020/0146029 A1* | 5/2020 | Takeda | H04L 1/1887 |
| 2020/0288438 A1* | 9/2020 | Takeda | H04W 72/02 |
| 2021/0037519 A1* | 2/2021 | Matsumura | H04J 13/0074 |
| 2021/0314107 A1* | 10/2021 | Yoshioka | H04L 1/1819 |

FOREIGN PATENT DOCUMENTS

| | | |
|---|---|---|
| EP | 3780444 A1 | 2/2021 |
| WO | 2018129325 A1 | 7/2018 |
| WO | 2019195757 A1 | 10/2019 |

OTHER PUBLICATIONS

Nokia, et al., "Discussion on reliability enhancement of PDCCH", 3GPP TSG-RAN WG1 Meeting #92bis, R1-1804617, Apr. 16-20, 2018, 6 Pages, Sanya, China.

NTT Docomo, Inc., "Offline summary for AI 7.1.3.3.4 UL data transmission procedure", 3GPP TSG RAN WG1 Meeting #92bis, R1-1805539, Apr. 16-20, 2018, 14 Pages, Sanya, China.

* cited by examiner

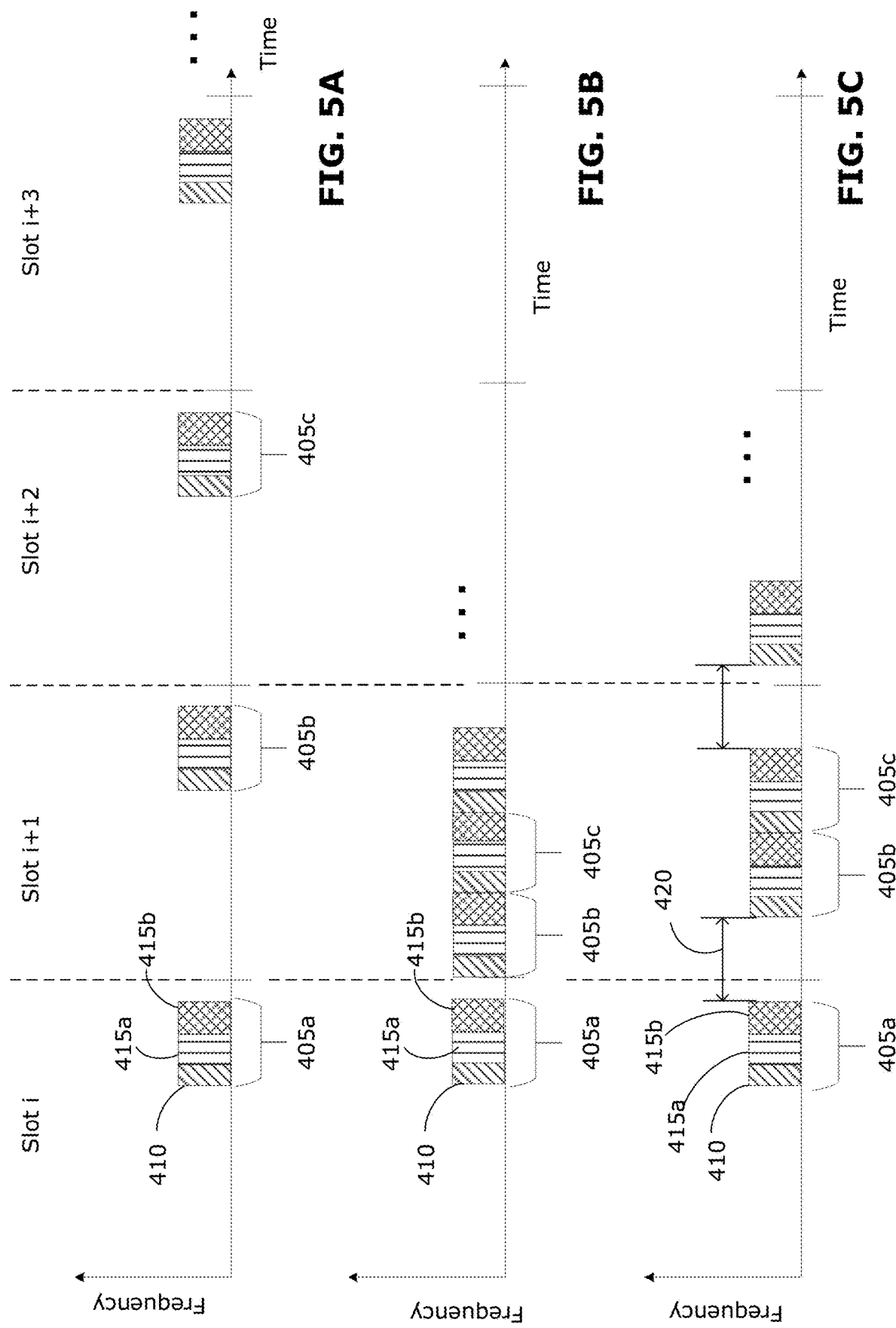

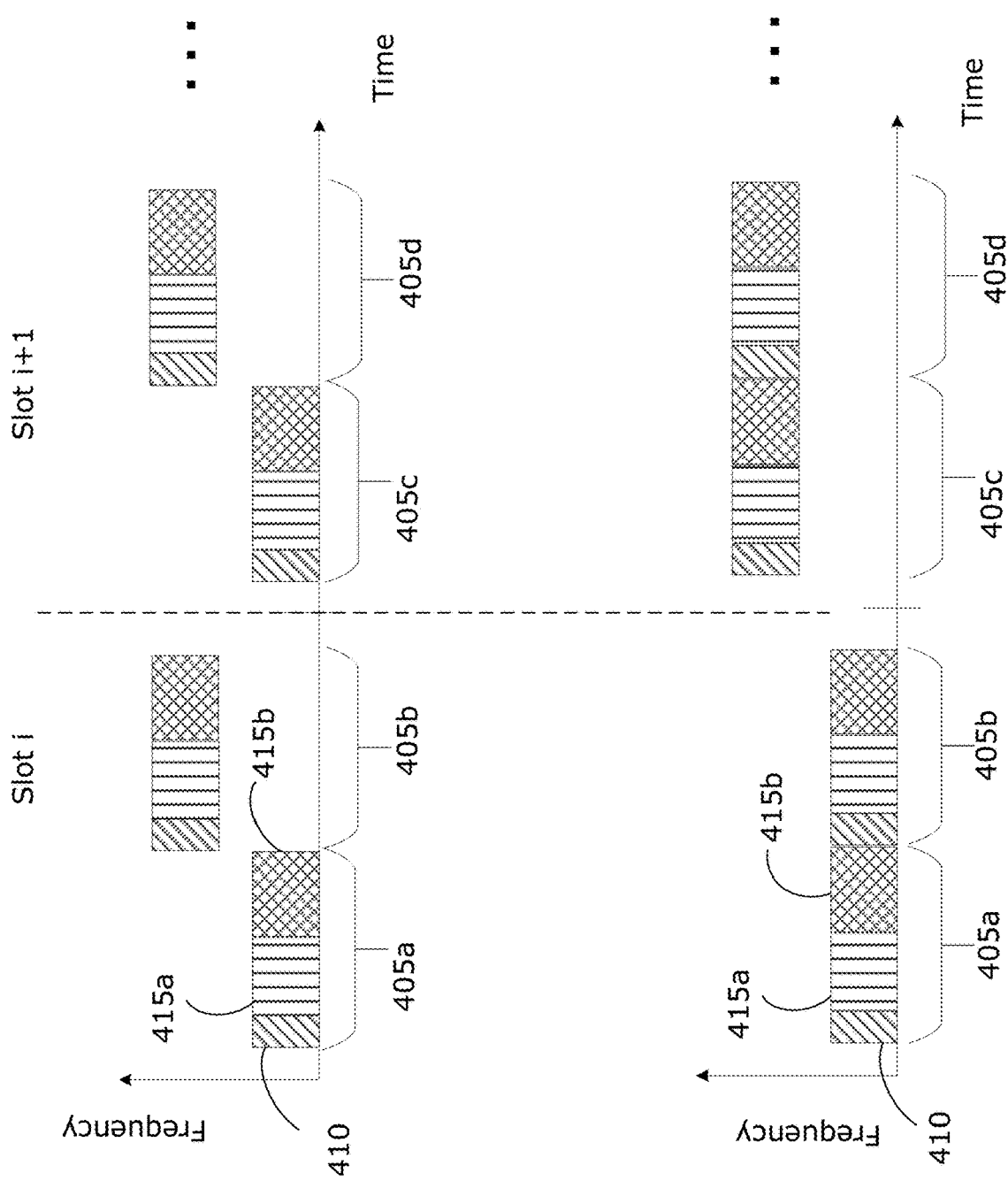

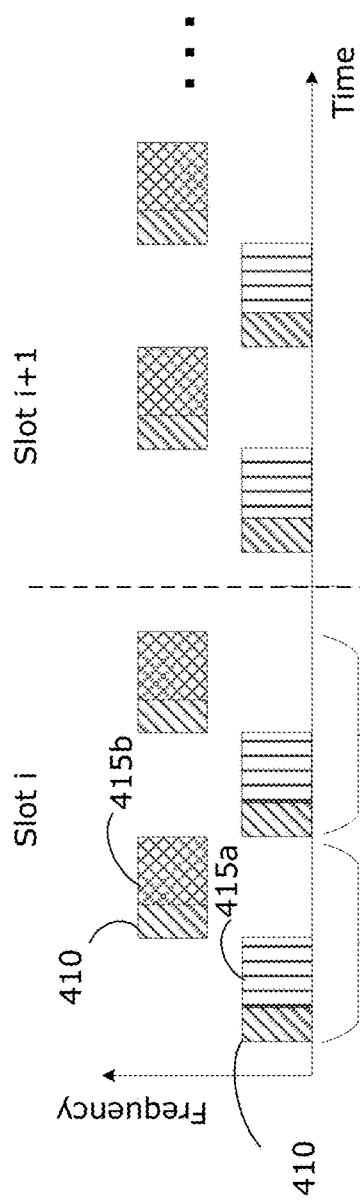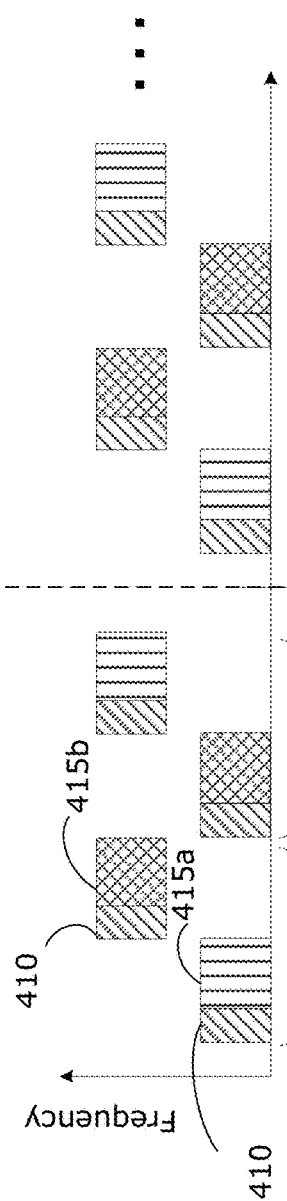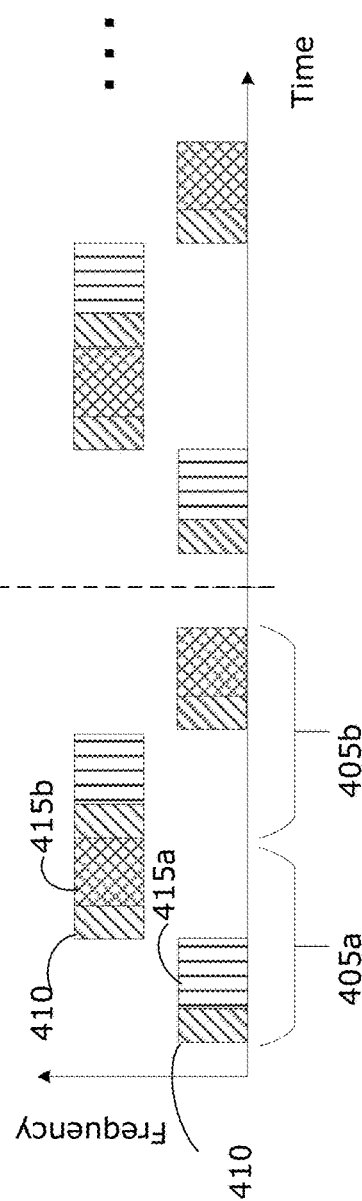

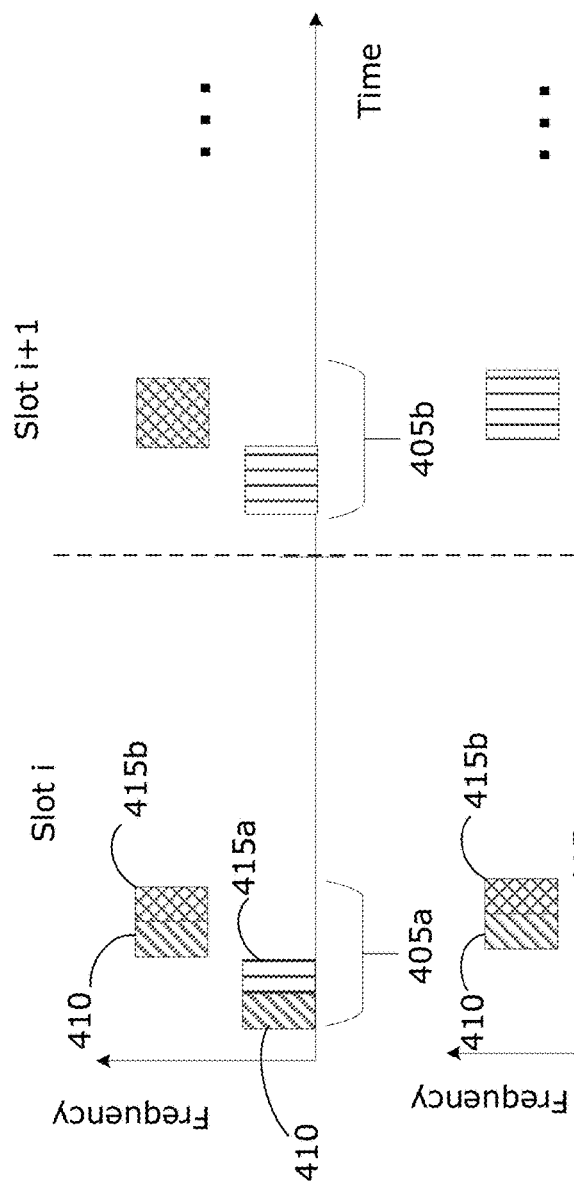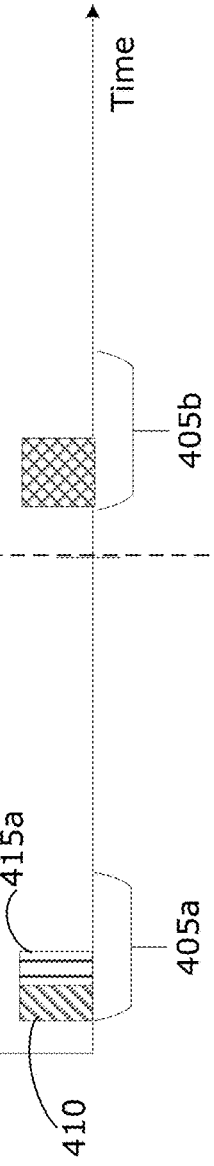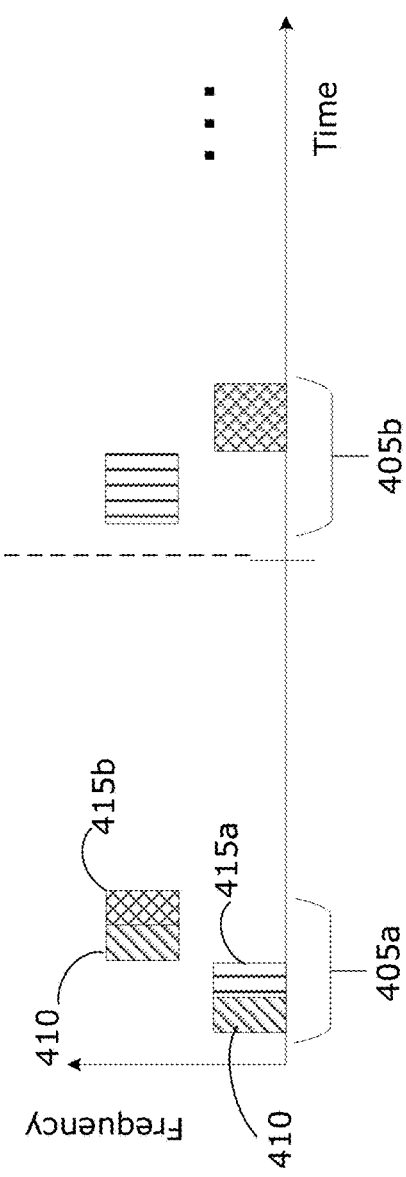

MINI-SLOT BASED REPETITION AND FREQUENCY HOPPING

CROSS-REFERENCE TO RELATED APPLICATIONS

The present disclosure claims priority from U.S. provisional patent application No. 62/716,799, entitled "MINI-SLOT BASED REPETITION AND FREQUENCY HOPPING", filed Aug. 9, 2018, the entirety of which is hereby incorporated by reference.

FIELD

The present disclosure relates to resource allocation for transmissions of repetitions over a channel. In particular, the present disclosure relates to resource allocation for transmission of repetitions, using mini-slot based repetition and/or using frequency hopping.

BACKGROUND

In Long-Term Evolution (LTE) networks, a number of uplink and downlink physical channels are used to carry data between an electronic device (e.g., a user equipment (UE)) and a base station, such as an evolved Node B (eNB). A physical uplink shared channel (PUSCH) may be used by an ED to transmit data to the base station. A PUSCH transmission may also include control information, such as reference signals (e.g., dedicated demodulation reference signal (DMRS)).

In 3rd Generation Partnership Project (3GPP) New Radio (NR) Release 15 (R15), slot-based PUSCH repetition is supported, in which transmission data is repeated a certain number of times. R15 also supports frequency hopping (FH), according to two defined modes.

In 5th Generation (5G) wireless communication technologies, ultra-reliable low latency communication (URLLC) is to be implemented. URLLC requires reduction in latency for wireless transmission of uplink data, among other requirements. It would be desirable to support other options for repetition and/or FH for PUSCH transmission, in order to reduce latency and help satisfy requirements for URLLC.

SUMMARY

In various examples described herein, different repetition formats are provided, using various options for intra-slot/inter-slot FH, and repetition of PUSCH transmission on the mini-slot level. The present disclosure also provides examples of signaling (e.g., using downlink control information (DCI) signals) that may be used to indicate what scheme for FH and/or repetition is to be used.

In some aspects, the present disclosure describes a method for transmitting k repetitions of a transmission over a channel. The method includes: sending a first repetition of the k repetitions over the channel, starting from a first symbol within a first slot, and using a first set of frequency resources; and sending a second repetition of the k repetitions over the channel, following the first repetition and starting from a second symbol within the first slot, and using a second set of frequency resources.

In any of the examples, at least the second repetition may be rate matched or punctured to fit within the first slot.

In any of the examples, the channel may be an uplink channel.

In any of the examples, the channel may be a downlink channel.

In any of the examples, the method may also include sending a third repetition of the k repetitions over the channel by: determining that the third repetition cannot be completely transmitted within the first slot; and sending the third repetition in a second slot following the first slot.

In any of the examples, the third repetition may be sent starting from a first symbol in the second slot.

In any of the examples, the third repetition maybe sent following a predefined time gap following the second repetition.

In any of the examples, the method may also include sending a third repetition of the k repetitions over the channel by: sending the third repetition over the channel, following the second repetition and starting from a third symbol within the first slot, wherein a portion of the third repetition is sent within a second slot following the first slot.

In any of the examples, the first repetition may be front-loaded with a reference signal and may be sent over the first set of frequency resources, and a subsequent repetition of the k repetitions that is sent using the first set of frequency resources may omit the reference signal.

In any of the examples, the method may also include: receiving, from a base station, a control signal indicating a repetition format to be used for transmitting the k repetitions. The first repetition and the second repetition may be sent using the first and second sets of frequency resources, in accordance with the indicated repetition format.

In any of the examples, the control signal may include an indicator of a predefined repetition format. The method may also include: determining the repetition format to use, by looking up the indicator in a look-up table.

In any of the examples, the method may also include: receiving a control signal indicating a repetition parameter for indicating whether the first and second repetitions are to be transmitted within the same slot.

In any of the examples, resource mapping type B may be used, according to a configuration parameter, and the method may also include: transmitting the first and second repetition in accordance with the repetition parameter.

In any of the examples, resource mapping type A may be used, according to a configuration parameter, and the method may also include: when the repetition parameter indicates that the first and second repetitions are to be transmitted within the same slot, ignoring the repetition parameter and transmitting the first and second repetitions in different slots.

In any of the examples, the method may also include: when the indicated repetition format is in conflict with another repetition format indication, selecting one of the conflicting indicators to take priority.

In some aspects, the present disclosure describes an apparatus that includes: a transmitter for sending transmission over a channel; and a processing unit coupled to the transmitter. The processing unit is configured to execute instructions to cause the apparatus to perform any of the preceding methods.

In any of the examples, the apparatus may be an electronic device (ED), or the apparatus may be a base station.

BRIEF DESCRIPTION OF THE DRAWINGS

Reference will now be made, by way of example, to the accompanying drawings which show example embodiments of the present application, and in which:

FIG. 5A is a schematic diagram illustrating an example of slot-based repetition used in R15;

FIG. 5B is a schematic diagram illustrating an example of mini-slot based repetition in accordance with another example of the present disclosure;

FIG. 5C is a schematic diagram illustrating another example of mini-slot based repetition in accordance with another example of the present disclosure;

FIG. 6A is a schematic diagram illustrating an example of mini-slot based repetition, with intra-slot FH, in accordance with an example of the present disclosure;

FIG. 6B is a schematic diagram illustrating an example of mini-slot based repetition, with inter-slot FH, in accordance with an example of the present disclosure;

FIG. 8A is a schematic diagram illustrating an example of mini-slot based repetition, with intra-slot FH and data splitting, in accordance with an example of the present disclosure;

FIG. 8B is a schematic diagram illustrating an example of mini-slot based repetition, with intra-slot FH and data switching, in accordance with an example of the present disclosure;

FIG. 8C is a schematic diagram illustrating another example of mini-slot based repetition, with intra-slot FH and data switching, in accordance with an example of the present disclosure;

FIGS. 10A-C are schematic diagrams illustrating examples of intra-slot FH with DMRS sharing, in accordance with an example of the present disclosure.

Similar reference numerals may have been used in different figures to denote similar components.

DESCRIPTION OF EXAMPLE EMBODIMENTS

Figure 1:
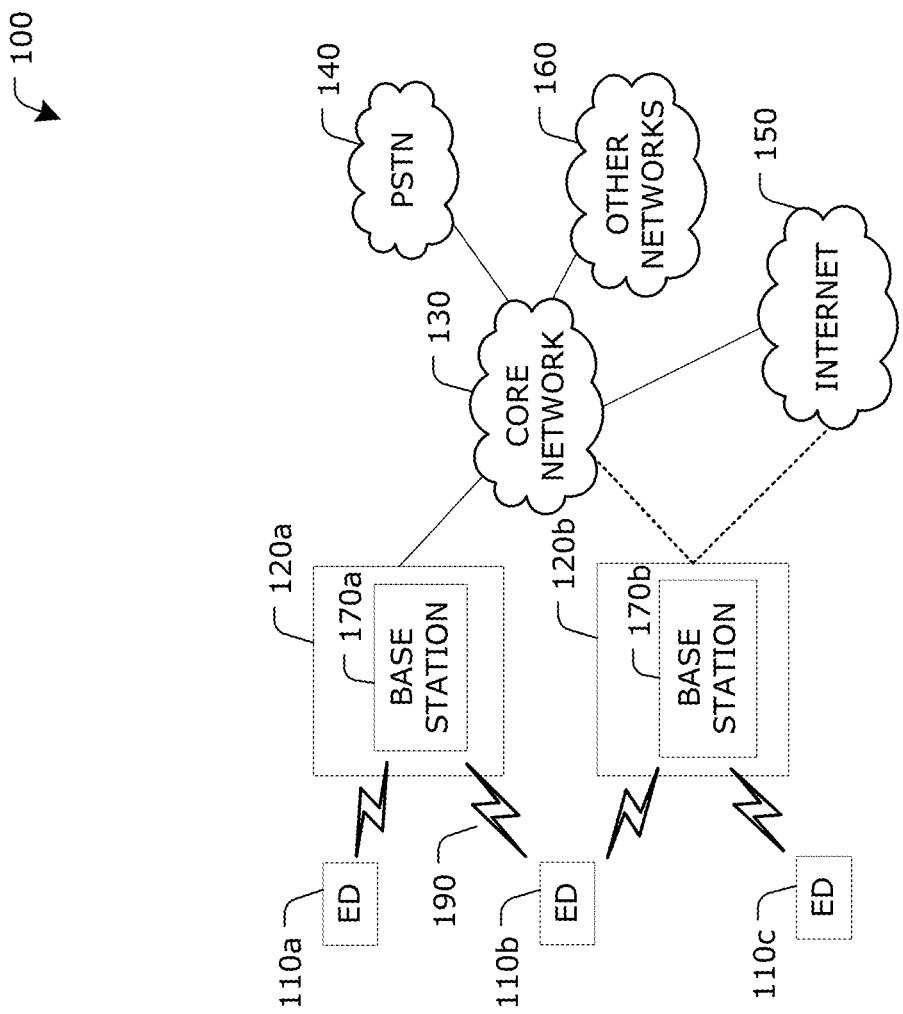
FIG. 1 is a network diagram of an example communication system in accordance with example embodiments of the present disclosure.

Examples described herein may help to reduce latency and/or improve performance compared to conventional repetition techniques for transmission over a physical uplink shared channel (PUSCH).

Examples described herein may be suitable for implementation in or be compatible with 3rd Generation Partnership Project (3GPP) New Radio (NR) technologies, including 3GPP NR Release 15 (R15). Examples described herein may be suitable for implementation in 5th Generation (5G) wireless communication technology, including ultra-reliable low latency communications (URLLC).

In 5G New Radio NR, different devices and services are expected to have different requirements for wireless communication. For example, some devices may require low-latency communication (e.g., less than 0.5 ms round trip) with high reliability (e.g., less than $10^{-5}$ block error rate (BLER)). These devices are proposed to communicate in a framework sometimes known as URLLC. URLLC may be unpredictable and sporadic in nature, and may not require a high data rate depending on the application. URLLC may be used in either uplink (UL) or downlink (DL), and may be particularly applicable in cases such as vehicle-to-vehicle (V2V) communication for coordinating automobile traffic.

To satisfy the requirements latency and reliability requirements of URLLC communication, a number of features are proposed that differ from conventional Long Term Evolution (LTE) communication and from NR enhanced mobile broadband (eMBB) communication.

In some examples, a portion of network resources, for example time-frequency resources such as one or more bandwidth parts (BWPs), is reserved for URLLC traffic and a different portion of network resources is reserved for eMBB traffic. Network resources that are used for URLLC traffic may be configured to increase flexibility or reduce latency, for example by having a finer granularity or periodicity of scheduling than the slot-based scheduling of eMBB, or a shorter minimum duration. URLLC transmissions in the physical downlink shared channel (PDSCH) or the physical uplink shared channel (PUSCH) may be as short as two symbols. The first symbol of an URLLC transmission may include a demodulation reference signal (DMRS).

In order to increase the reliability of URLLC transmissions, a URLLC transmitter may be configured to transmit k repetitions of a URLLC transmission, where k is an integer greater than one. The value of k may be configurable, for example by higher-layer signaling (e.g., radio resource control (RRC) signaling). The k repetitions consist of an initial transmission (also referred to as the first repetition) and k−1 retransmissions (also referred to as repetitions) of either the initial transmission or a different redundancy version (RV) of the initial transmission. To mitigate the latency associated with retransmissions, the URLLC transmitter may transmit all k repetitions without waiting for or receiving HARQ feedback from the URLLC receiver, e.g. consecutively in time. The k repetitions are transmitted irrespectively of whether previous repetitions of the URLLC transmission were successfully received. Alternatively, the URLLC transmitter may continue to transmit repetitions until the URLLC transmitter receives a grant of scheduled uplink resources to retransmit the URLLC transmission, up to a maximum of k total repetitions. The k repetitions may be transmitted on the same frequency resources, e.g. the same bandwidth part, or may use frequency hopping (FH) so that not all of the k repetitions are transmitted on the same frequency resources. In some embodiments, one or more of the k repetitions may be transmitted in frequency resources for eMBB traffic, in which case these repetitions may preempt eMBB traffic.

Examples of the present disclosure provide various schemes for transmission of the k repetitions, including schemes that involve inter-slot or intra-slot FH, as discussed further below.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (e.g., voice, data, video, text) via broadcast, narrowcast, user device to user device, etc. The communication system 100 may operate by sharing resources such as bandwidth.

In this example, the communication system 100 includes electronic devices (ED) 110a-110c (generically referred to as ED 110), radio access networks (RANs) 120a-120b, a core network 130, a public switched telephone network (PSTN) 140, the Internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c may be configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, smart device, or consumer electronics device, among other possibilities.

In FIG. 1, the RANs 120a-120b include base stations 170a-170b, respectively. Each base station 170a-170b (generically referred to as base station 170) is configured to wirelessly interface with one or more of the EDs 110a-110c to enable access to any other base station 170a-170b, the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home eNodeB, a gNodeB (gNB), a transmission point (TP), a site controller, an access point (AP), or a wireless router. Any ED 110a-110c may be alternatively or additionally configured to interface, access, or communicate with any other base station 170a-170b, the Internet 150, the core network 130, the PSTN 140, the other networks 160, or any combination of the preceding. The communication system 100 may include RANs, such as RAN 120b, wherein the corresponding base station 170b accesses the core network 130 via the Internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RANs may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2A:
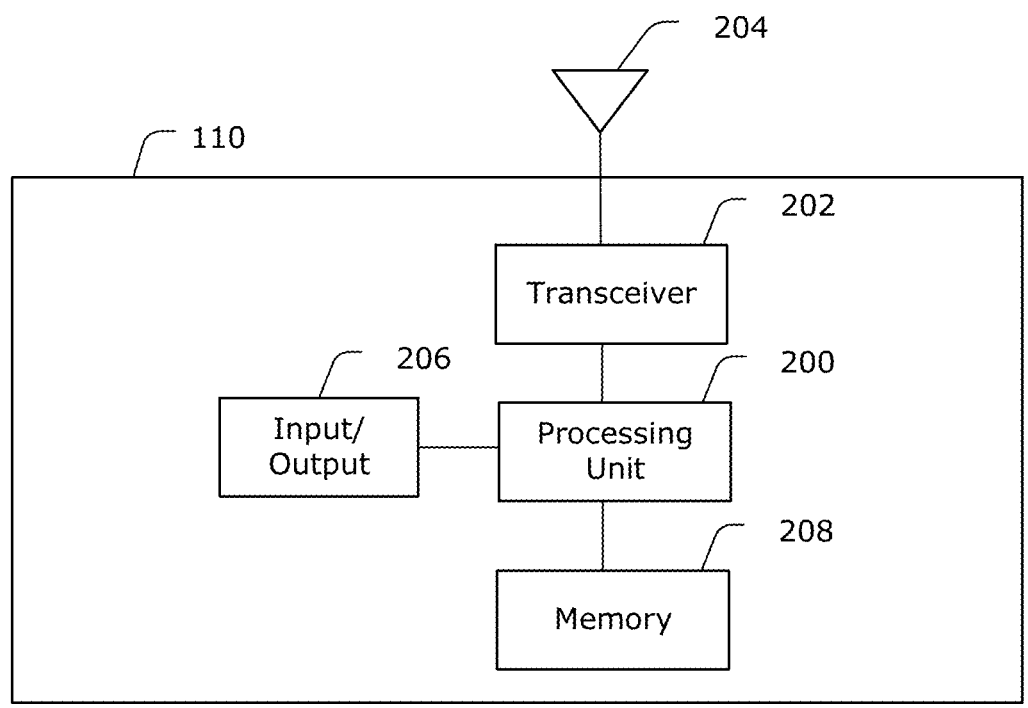
FIG. 2A is a block diagram of an example electronic device in accordance with example embodiments of the present disclosure.
Figure 2B:
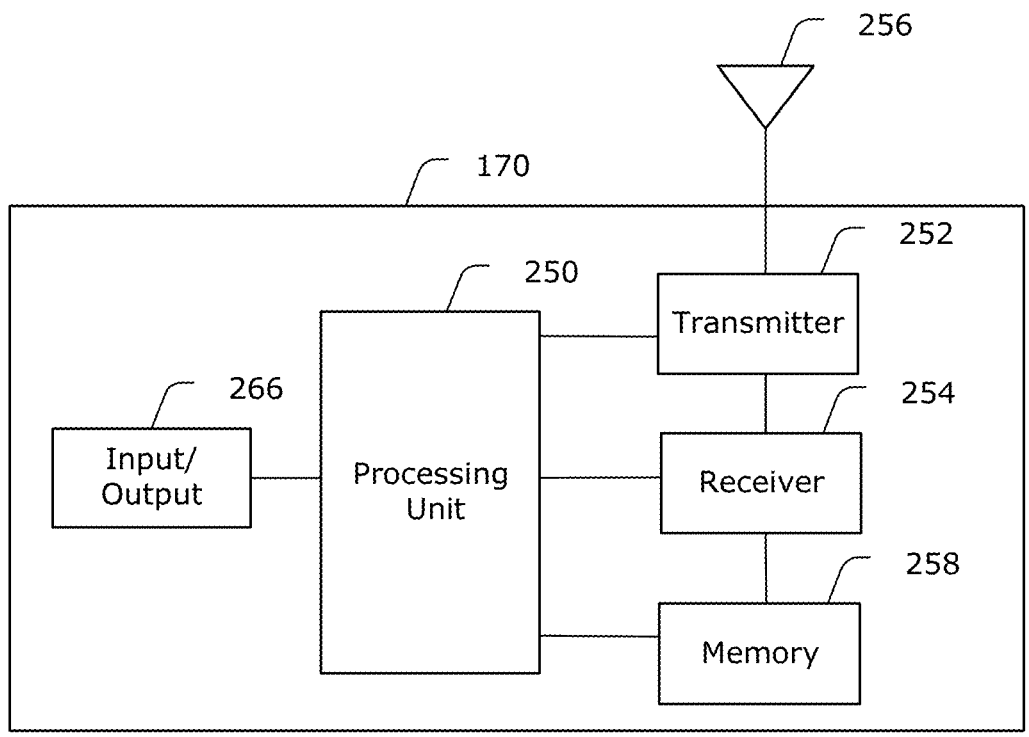
FIG. 2B is a block diagram of another example electronic device in accordance with example embodiments of the present disclosure.

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. In some examples, one or more antennas 204 may be an array antenna 204, which may be used to perform beamforming and beam steering operations. Although shown as a single functional unit, a transceiver 202 could also be implemented using at least one transmitter and at least one separate receiver.

The ED 110 further includes one or more input/output devices 206 or input/output interfaces (such as a wired interface to the internet 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs 110 or other devices. Each receiver 254 includes any suitable structure for processing signals received wirelessly or by wire from one or more EDs 110 or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an array antenna, which may be used for beamforming and beam steering operations. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

Figure 3:
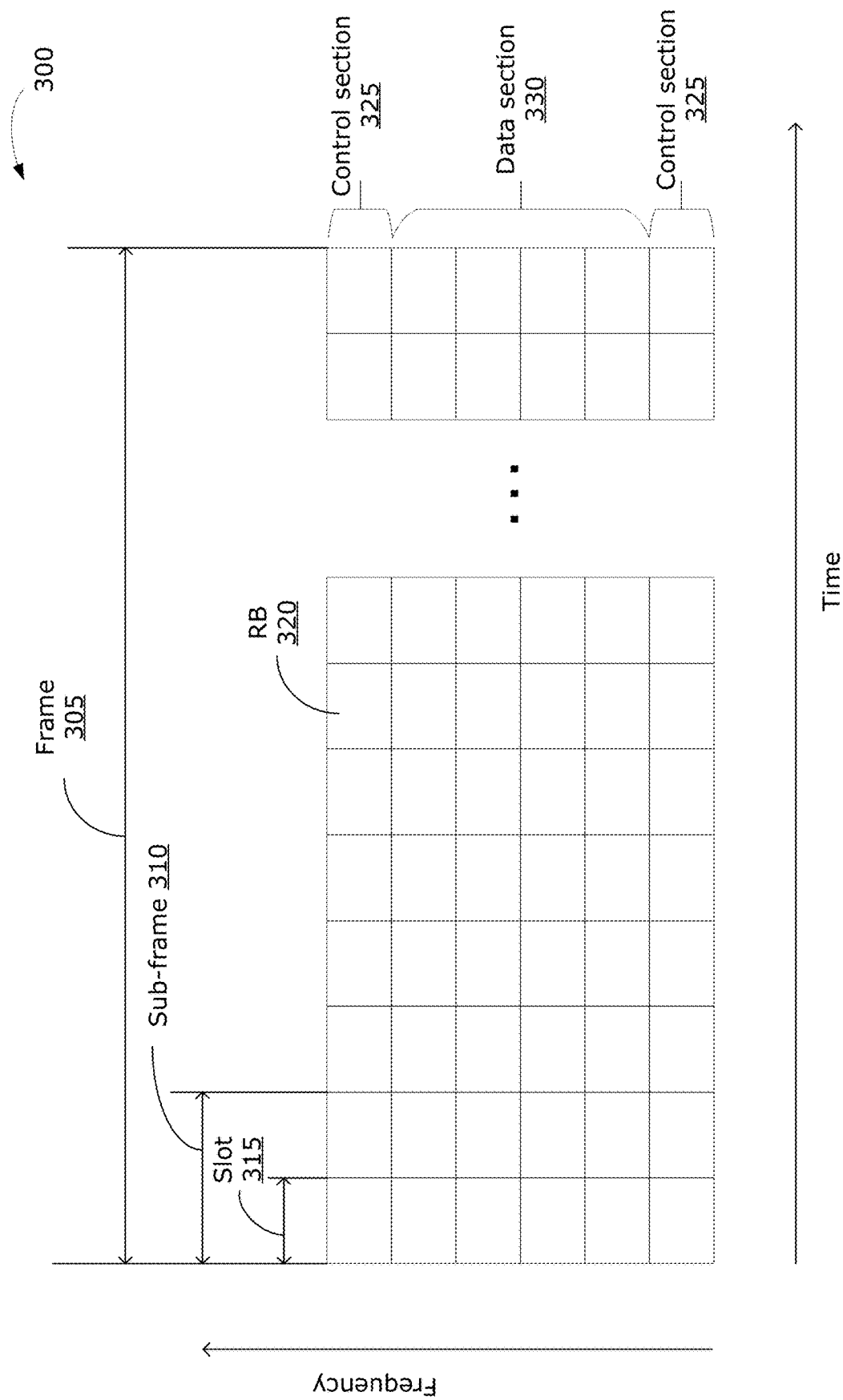
FIG. 3 is a schematic diagram illustrating the structure of an example frame for transmission on an uplink channel.

FIG. 3 is a schematic diagram illustrating an example frame structure 300 for a frame that may be transmitted in an uplink channel (e.g., PUSCH), in particular an LTE frame. A frame 305 is a defined unit of time (e.g., 10 ms in LTE), and can be divided into subframes 310 (e.g., 1 ms each in LTE). Each subframe 310 can be further divided into slots 315 (e.g., 0.5 ms in LTE). In some cases, time divisions shorter than one slot 315 may be referred to as mini-slots. The frame structure 300 divides time and frequency resources into resource blocks (RBs) 320. One RB 320 is the smallest unit of resources that can be allocated to a user in LTE. Each RB 320 is associated with a defined frequency bandwidth and time period. Time and frequency resources within a single RB 320 may be further divided into subcarriers and symbols (e.g., 12 subcarriers in the frequency domain, and 7 symbols in the time domain, in LTE). The frame structure 300 may be divided into control section(s) 325 and data section(s) 330, as shown. The control section(s)

325 may include RBs 320 that are used for transmission of control information. The data section(s) 330 may include RBs 320 that are used for transmission of user data, as well as control information.

An ED 110 may be assigned RB(s) 320 for uplink transmission to a base station 170, for example using PUSCH. As will be described in various examples below, different repetition formats may be used for transmitting repetitions over PUSCH.

In R15, slot-based PUSCH repetition is supported, in which transmission data is repeated a certain number of times (e.g., configured by setting aggregationFactorUL to be greater than one in the Radio Resource Control (RRC) protocol). According to R15, slot-based PUSCH repetition is limited to single-layer transmission, and the UE shall repeat the TB across the aggregationFactorUL consecutive slots applying the same symbol allocation and frequency allocation in each slot. A table is defined in TS28.214 to provide the associated between an RV identifier (which may be selected dynamically using DCI signals) and the respective RV sequence used in the repetitions. R15 also supports frequency hopping (FH) in two defined modes. In Mode 1, intra-slot FH is supported, and is applicable to single-slot and multi-slot PUSCH transmission. In Mode 2, inter-slot FH is supported, and is applicable to multi-slot PUSCH transmission. Although not explicit, Table 6.4.1.1.3-6, which defines PUSCH DMRS positions, appears to support intra-slot FH.

Some example schemes for resource allocation for PUSCH transmission have been explored, for example in U.S. provisional patent application No. 62/621,036, filed Jan. 23, 2018 and entitled "System and method for time domain grant-free PUSCH resource allocation".

Figure 4A:
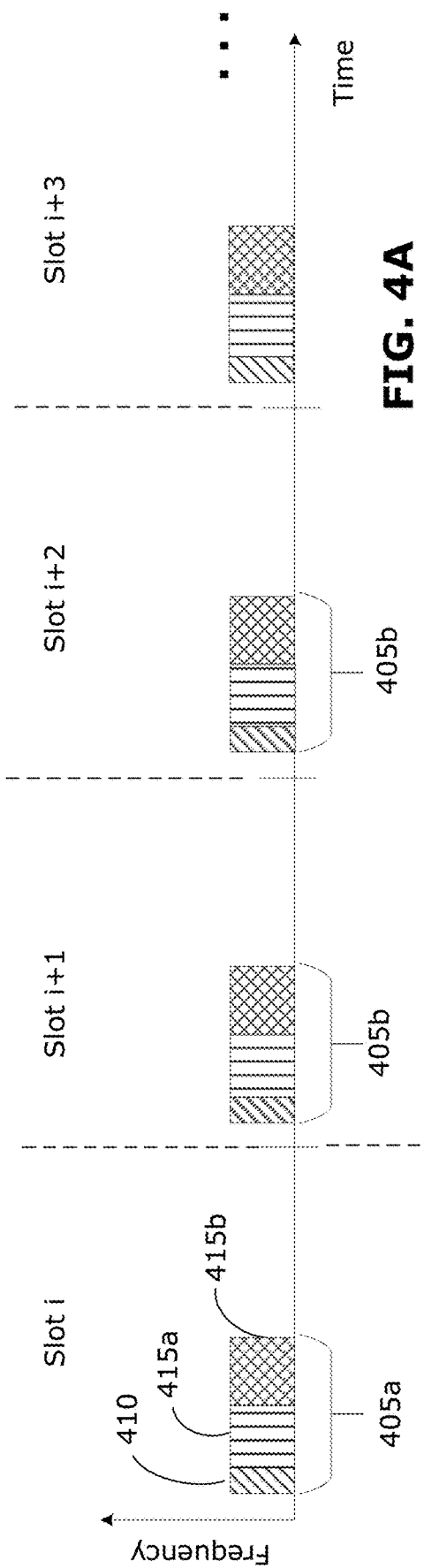
FIG. 4A is a schematic diagram illustrating an example of slot-based repetition used in R15.

FIG. 4A is a schematic diagram illustrating an example of a conventional scheme for slot-based PUSCH repetition, for example in accordance with R15. FIG. 4A represents PUSCH transmissions (also referred to simply as transmissions) over time and frequency resources, starting from arbitrary slot i, and over an arbitrary frequency band. The PUSCH transmissions include k repetitions, including a first transmission 405a, a second transmission 405b and a third transmission 405c (generically referred to as transmission 405). Although referred to as "first", "second" and "third" transmissions 405a, 405b, 405c, it should be understood that the transmissions shown in FIG. 4A do not necessarily represent the first, second and third repetitions of the k repetitions. In the present disclosure, each transmission of the k repetitions may also be referred to as a repetition, for a total of k repetitions. That is, the first repetition may refer to the initial transmission of the k repetitions. Each transmission includes a reference signal that may be used for channel estimation (e.g., a DMRS 410), a first portion 415a and a second portion 415b. The first and second portions 415a, 415b may each carry user data, control information, or both. Moreover, uplink data from the ED may be multiplexed with the reference signal. The division between first and second portions 415a, 415b may be arbitrary. For clarity, only the first instance of the DMRS 410, the first portion 415a and the second portion 415b has been labeled in FIG. 4A. Throughout the figures, the DMRS 410 is indicated by a diagonal hatch pattern, the first portion 415a is indicated by a vertical hatch pattern, and the second portion 415b is indicated by a cross-hatch pattern. For convenience, the same reference characters may be used in the present disclosure to discuss different repetition formats, and the above discussion should be understood to apply to other figures described in detail below (with variation as appropriate). It should be understood that the figures are representative only, and are not necessarily shown to scale.

In the repetition format shown in FIG. 4A, slot-based repetition is used. That is, each transmission 405 is transmitted in a respective different slot (e.g., first transmission 405a is transmitted at slot i, second transmission 405b is transmitted at slot i+1, and so forth).

Figure 4B:
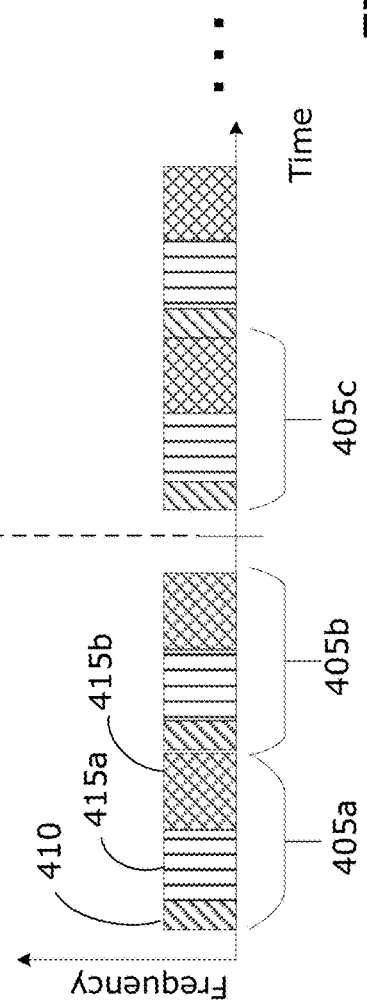
FIG. 4B is a schematic diagram illustrating an example of mini-slot based repetition in accordance with an example of the present disclosure.

FIG. 4B is a schematic diagram illustrating an example disclosed repetition format for PUSCH transmissions, using mini-slot based repetition. For ease of comparison, the slot timing of FIG. 4B has been lined up with the slot timing of FIG. 4A. In this example repetition format, the first transmission 405a may be transmitted using the time and frequency resource indicated, for example in a DCI signal. This may be similar to the transmission of the first transmission 405a in the example of FIG. 4A. In the case of FIG. 4B, however, the second transmission 405b may be transmitted within the same slot as the first transmission 405a. This may be referred to as mini-slot based repetition, because the repetition occurs on a time scale smaller than a slot. Mini-slot based repetition may also be referred to as non-slot based repetition, because the repetition occurs on a time scale that is not slot-based.

In the example of FIG. 4B, the second transmission 405b is transmitted using the same frequency resource as the first transmission 405a. The second transmission 405b may be transmitted in the immediate symbol after the end symbol of the first transmission 405a, or the second transmission 405b may be transmitted after a predetermined time gap (e.g., after a preset number of symbols, which may be configured by a higher layer parameter) after the end of the previous transmission 405a. Each subsequent transmission 405 may similarly be transmitted immediately after the immediately preceding transmission 405 or after a predetermined time gap.

If the timing of a transmission 405 is expected to cause the transmission 405 to cross the slot boundary, then the transmission 405 may be scheduled to start in the next slot, at the first symbol of the next slot or at the symbol indicated by the DCI signal. For example, the third transmission 405c in FIG. 4B would cross the slot boundary (indicated by dotted line) if the third transmission 405c immediately followed the second transmission 405b. Instead, the third transmission 405c is scheduled to start at the symbol indicated by the DCI signal, in the next slot (slot i+1). In some examples, the third transmission 405c in FIG. 4B may be rate matched or punctured to fit in the same slot as the second transmission 405b. In some examples, a transmission 405 may be permitted to cross the slot boundary, in which case each repetition transmission 405 may start on the symbol immediately after or following a predetermined gap after the preceding transmission 405, regardless of slot boundary.

Figure 4C:
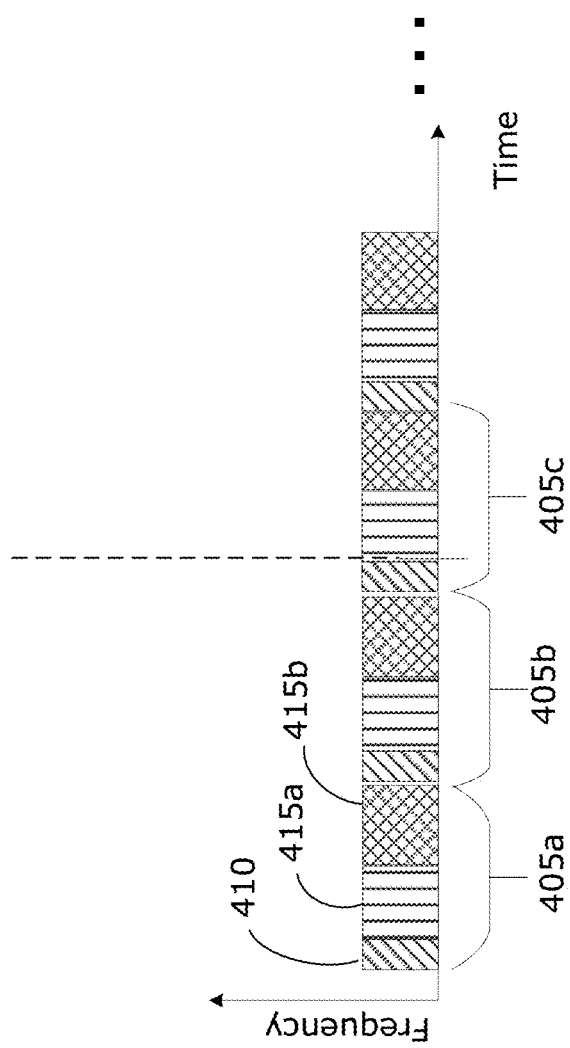
FIG. 4C is a schematic diagram illustrating another example disclosed repetition format for PUSCH transmissions, using mini-slot based repetition, in which transmissions may cross a slot boundary.

FIG. 4C illustrates is a schematic diagram illustrating an example disclosed repetition format for PUSCH transmissions, using mini-slot based repetition, and in which a transmission is permitted to cross the slot boundary. The example illustrated in FIG. 4C is similar to the example of FIG. 4B. However, in the example of FIG. 4C, the third transmission 405c immediately follows the second transmission 405b and the third transmission 405c crosses the slot boundary (indicated by dotted line). It should be understood that any one of the transmission 405 may be permitted to cross the slot boundary in a similar manner. It should also be understood that crossing of the slot boundary in a similar manner may be permitted by any of the example repetition formats described herein.

As may be appreciated by comparing FIG. 4A with FIGS. 4B and 4C, the example disclosed repetition format may enable the k repetitions to be transmitted in a shorter amount of time, compared to the conventional approach, thus reducing overall latency.

The transmissions 405 may be continued in this manner until the required k repetitions have been transmitted. It should be noted that in the figures, each PUSCH transmission 405 is shown with a front-loaded DMRS 410 (that is, the DMRS 410 occurs at the beginning of the transmission 405), however there may be additional DMRS 410 present, or the DMRS 410 may be provided at other positions in the transmission 405. Further, the transmission 405 may start on any symbol of the PUSCH, thus both PUSCH mapping type A and mapping type B may be used.

FIGS. 5B and 5C illustrate variations of the disclosed repetition format discussed above with respect to FIG. 4B. For comparison, FIG. 5A illustrates a conventional repetition format in accordance with R15.

As shown in FIG. 5A, the conventional repetition format has slot-based repetition, such that each slot has only one transmission 405 scheduled. Further, each transmission 405 starts at the time indicated (e.g., in the DCI signal) within each respective slot.

In the example disclosed repetition format shown in FIG. 5B, the first transmission 405a is transmitted using the time and frequency resource indicated. Each subsequent transmission 405 is transmitted in the symbol immediately following the end of the immediately previous transmission 405 (or following a predetermined number of symbols, which may be configured by a higher-layer parameter), except if the timing would cause the transmission 405 to cross the slot boundary. If the transmission 405 would have crossed the slot boundary, then the transmission 405 instead starts at the first symbol of the next slot. For example, the second transmission 405b is scheduled to start at the first symbol of slot i+1, because otherwise the second transmission 405b would have crossed the slot boundary. The third transmission 405c immediately follows the second transmission 405b (or following a predetermined number of symbols).

In the example disclosed repetition format shown in FIG. 5C, the first transmission 405a is transmitted using the time and frequency resource indicated. Each subsequent transmission 405 is transmitted in the symbol immediately following the end of the immediately previous transmission 405 (or following a predetermined number of symbols, which may be configured by a higher-layer parameter), except if the timing would cause the transmission 405 to cross the slot boundary. If the transmission 405 would have crossed the slot boundary, then the transmission 405 instead starts after a predetermined time gap following the preceding transmission. For example, the second transmission 405b is scheduled to start following a time gap 420 after the end of the first transmission 405a, because otherwise the second transmission 405b would have crossed the slot boundary. The time gap 420 may be equal to the time required to transmit one transmission 405, for example. The third transmission 405c immediately follows the second transmission 405b (or following a predetermined number of symbols).

As may be appreciated by comparing FIGS. 5A-C, the example disclosed repetition formats may enable the k repetitions to be transmitted in a shorter amount of time, compared to the conventional approach, thus reducing overall latency.

In some examples, the disclosed repetition format may use FH on and inter-slot or intra-slot basis. Use of FH introduces frequency diversity for the k repetitions, which may help to improve the reliability of the transmissions.

FIG. 6A is a schematic diagram illustrating an example disclosed repetition format using mini-slot based repetition, with intra-slot FH. In the example of FIG. 6A, the second transmission 405b immediately follows the first transmission 405a, however the second transmission 405b uses a different set of frequency resources than the first transmission 405a. Thus, within the same slot, different sets of frequency resources are used for different repetitions. This may be referred to as intra-slot FH. Subsequent transmissions 405 in subsequent slots may use a similar FH pattern. For example, the third and fourth transmissions 405c, 405d may use frequency resources following a pattern similar to the first and second transmissions 405a, 405b. Although examples discussed herein show FH over two different sets of frequency resources, it should be understood that inter-slot FH or intra-slot FH may be performed over more than two different sets of frequency resources. Although the examples illustrated show two transmissions 405 within one slot, it should be understood that there may be more than two transmissions 405 within one slot (e.g., depending on the length of each transmission 405). The transmissions 405 within one slot may alternate use of frequency resources (e.g., between first and second sets of frequency resources), for example. The pattern of frequency resource usage in one slot may be repeated in a next slot, or the next slot may have a different pattern of frequency resource usage. The PUSCH transmission 405 may or may not be divided in more than two different portions for intra-slot FH, for example as discussed further below.

FIG. 6B is a schematic diagram illustrating an example disclosed repetition format using mini-slot based repetition, with inter-slot FH. In the example of FIG. 6B, the transmissions 405 within one slot both use a first set of frequency resources, however transmissions 405 within a following slot use a second, different set of frequency resources. For example, the first and second transmissions 405a, 405b within slot i use the same first set of frequency resources, but the third and fourth transmissions 405c, 405d within slot i+1 both use a second, different set of frequency resources. This repetition format, in which different sets of frequency resources are used in different slots, may be referred to as inter-slot FH. Subsequent slots may alternate between two sets of frequency resources, for example.

The examples of FIGS. 6A and 6B, in which intra-slot FH (FIG. 6A) or inter-slot FH (FIG. 6B) are used, may be compared to the example of FIG. 4B, in which there is no FH. Compared to the example of FIG. 4B, the use of intra-slot or inter-slot FH may provide frequency diversity and greater reliability of transmission. It should be noted that inter-slot FH is already supported in R15, although not the use of mini-slot repetition together with inter-slot FH, as shown in FIG. 6B.

Figure 7A:
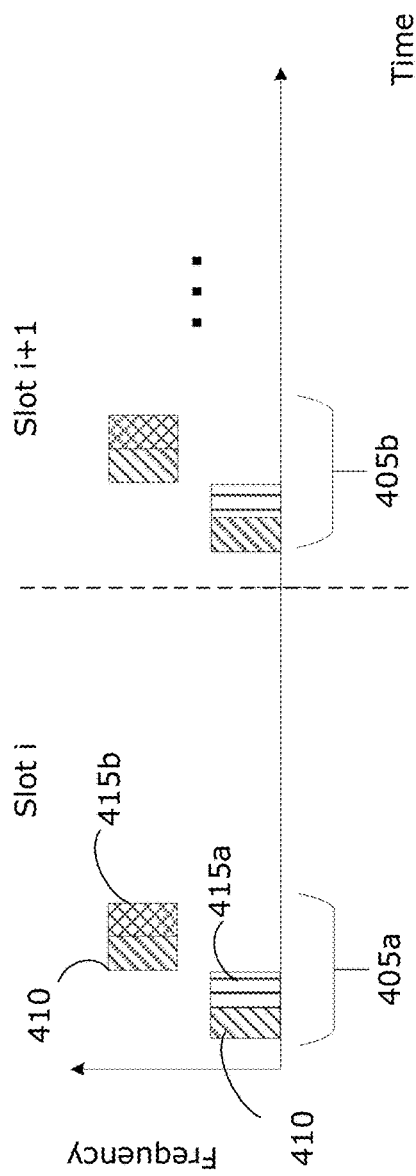
FIG. 7A is a schematic diagram illustrating an example of slot-based repetition, with intra-slot FH and data splitting, used in R15.

In some conventional repetition formats, such as supported by R15, intra-slot FH is supported where data splitting is used. FIG. 7A shows an example of slot-based repetition, with intra-slot FH with data splitting, as supported by R15. In this example, within the first transmission 405a, a first portion 415a is divided from a second portion 415b, and the first and second portions 415a, 415b are transmitted using different sets of frequency resources. This may be referred to as data splitting. The data splitting and FH may be repeated in the second transmission 405b in the next slot, and each subsequent transmission in the following slots. It should be noted that each of the first and second portions 415a, 415b includes a respective DMRS 410. This may introduce higher overhead compared to repetition formats where data splitting is not used. Due to the added DMRS 410 in transmissions using other resources (compared to the case where data splitting is not used), the PUSCH transmission 405 including at least the first and second portions 415a, 415b may be rate matched around the added DMRS resource elements or symbols.

Figure 7B:
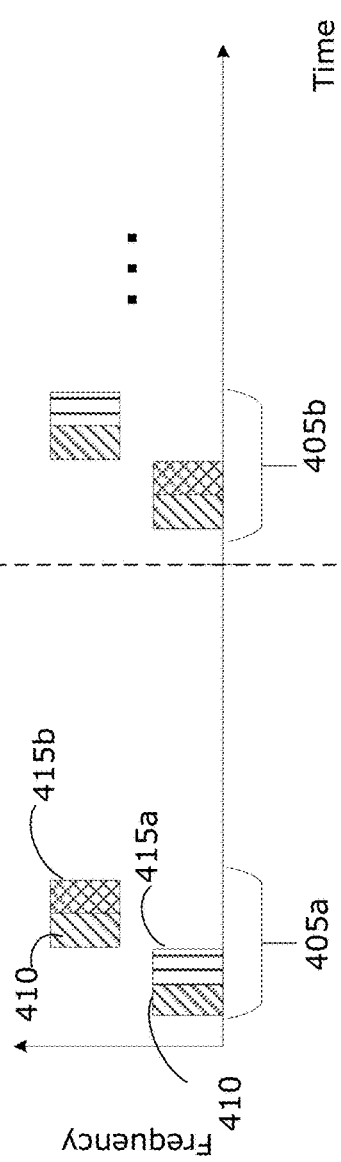
FIG. 7B is a schematic diagram illustrating an example of slot-based repetition, with intra-slot FH and data switching, used in R15.

FIG. 7B shows a variation of the conventional repetition format with slot-based repetition, in which data switching is used in addition to intra-slot FH and data splitting. In the example of FIG. 7B, the intra-slot timing and frequency resources used by the first and second portions 415a, 415b are different between the first and second transmissions 405a, 405b. For example, in the first transmission 405a, the first portion 415a is transmitted first (with transmission of DMRS 410) using the first set of frequency resources, and the second portion 415b is transmitted second (with transmission of DMRS 410) using the second set of frequency resources. In the second transmission 405b in the next slot, the second portion 415b is transmitted first (with transmission of DMRS 410) using the first set of frequency resources, and the first portion 415a is transmitted second (with transmission of DMRS 410) using the second set of frequency resources. Subsequent transmissions 450 may alternate between the two patterns of resource usage. This switching of frequency resources for first and second portions 415a, 415b may be referred to as data switching.

Figure 7C:
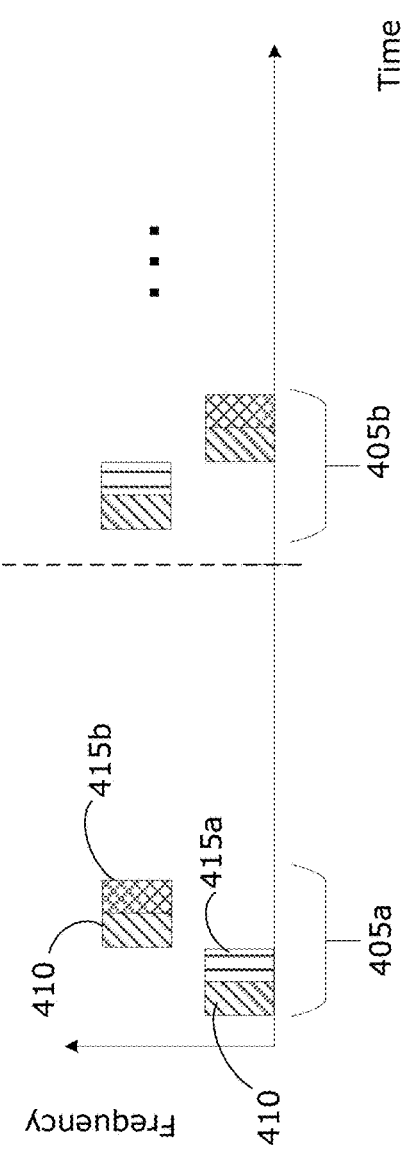
FIG. 7C is a schematic diagram illustrating another example of slot-based repetition, with intra-slot FH and data switching, used in R15.

FIG. 7C shows another variation of the conventional repetition format with slot-based repetition, in which another form of data switching is used in addition to intra-slot FH and data splitting. In the example of FIG. 7C, the frequency resources used by the first and second portions 415a, 415b of the transmission are different between the first and second transmissions 405a, 405b, but the intra-slot timing of the first and second portions 415a, 415b is the same between transmissions 405. For example, in the first transmission 405a, the first portion 415a is transmitted first (with transmission of DMRS 410) using the first set of frequency resources, and the second portion 415b is transmitted second (with transmission of DMRS 410) using the second set of frequency resources. In the second transmission 405b in the next slot, the first portion 415a is transmitted first (with transmission of DMRS 410) using the second set of frequency resources, and the second portion 415b is transmitted second (with transmission of DMRS 410) using the first set of frequency resources. Subsequent transmissions 405 may alternate between the two patterns of resource usage.

Examples of the disclosed repetition formats may also use data splitting and/or data switching for intra-slot FH.

FIG. 8A is a schematic diagram illustrating an example disclosed repetition format using mini-slot based repetition, with intra-slot FH, and data splitting. In the example of FIG. 8A, intra-slot FH is performed on portions of the transmission 405. Within one transmission 405, a first portion 415a is divided from a second portion 415b, and the first and second portions 415a, 415b are transmitted using different sets of frequency resources. Each transmission 405 may use a similar pattern of data splitting and FH.

FIG. 8B is a schematic diagram illustrating an example disclosed repetition format using mini-slot based repetition, with intra-slot FH, and data switching. In the example of FIG. 8B, the intra-slot timing and frequency resources used by the first and second portions 415a, 415b are different between the first and second transmissions 405a, 405b, within a single slot. For example, in the first transmission 405a, the first portion 415a is transmitted first using the first set of frequency resources, and the second portion 415b is transmitted second using the second set of frequency resources. In the second transmission 405b within the same slot, the second portion 415b is transmitted first using the first set of frequency resources, and the first portion 415a is transmitted second using the second set of frequency resources. Subsequent transmissions 450 may alternate between the two patterns of resource usage.

FIG. 8C is a schematic diagram illustrating another example disclosed repetition format using mini-slot based repetition, with intra-slot FH, and data switching. In the example of FIG. 8C, the frequency resources used by the first and second portions 415a, 415b are different between the first and second transmissions 405a, 405b, within a single slot. For example, in the first transmission 405a, the first portion 415a is transmitted first using the first set of frequency resources, and the second portion 415b is transmitted second using the second set of frequency resources. In the second transmission 405b within the same slot, the first portion 415a is transmitted first using the second set of frequency resources, and the second portion 415b is transmitted second using the first set of frequency resources. Subsequent transmissions 450 may alternate between the two patterns of resource usage.

The example disclosed repetition formats of FIGS. 8A-8C provide frequency diversity, similar to the conventional repetition formats shown in FIG. 7A-7C. However, the example disclosed repetition formats of FIGS. 8A-8C, by using mini-slot based repetition, have reduced latency compared to the conventional repetition formats shown in FIG. 7A-7C.

The use of intra-slot FH with mini-slot repetition may be implemented by modifying the equation in section 6.3 in TS38.214 V15.2.0 (2018-06) of R15 (which is an equation to indicate the starting resource block (RB) during in each hop when using intra-slot FH with slot-based repetition), or by providing a table, such that FH is implemented based on mini-slot index instead of slot index. As specified by TS38.214, when frequency hopping on PUSCH is enabled and resource allocation type 1 is used, frequency offsets are configured by the higher layer parameter frequencyHoppingOffsetLists in PUSCH-Config. As specified, when the size of the active bandwidth part (BWP) is less than 50 physical resource blocks (PRBs), one of two higher layer configured offsets is indicated in the uplink grant. When the size of the active BWP is equal to or greater than 50 PRBs, one of four higher layer configured offsets is indicated in the uplink grant. For example, for an intra-slot FH for slot-based repetition, the starting RB for each frequency hop is defined according to TS38.214 section 6.3 as follows:

The starting RB during in each hop is given by:

$$RB_{start} = \begin{cases} RB_{start} & \text{First hop} \\ (RB_{start} + RB_{offset}) \bmod N_{BWP}^{size} & \text{Second hop} \end{cases},$$

where $RB_{start}$ is the starting resource within the uplink BWP, as calculated from the resource block assignment information of resource allocation type 1, $RB_{offset}$ is the frequency offset in RBs between the two frequency hops, and $N_{BWP}^{size}$ is the size of the bandwidth part in PRBs.

This equation applies to each of the repetitions, where the first hop refers to the first portion (with DMRS) of the PUSCH transmission, and the second hop refers to the second portion (with DMRS) of the PUSCH transmission, regardless of slot. In some examples, as discussed further below, DMRS sharing may be used and one or more subsequent transmissions (occurring within the coherence time of the channel) may omit the DMRS.

For inter-slot FH for slot-based repetition as follows:
In case of inter-slot frequency hopping, the starting RB during slot $n_s^\mu$ is given by:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases},$$

where $n_s^\mu$ is the current slot number within a radio frame for subcarrier spacing configuration μ, where a multi-slot PUSCH transmission can take place.

For mini-slot based repetition with intra-slot frequency hopping, the above equation may be modified by replacing $n_s^\mu$ with the repetition number (e.g. denoted by rep #), instead of the slot number. That is, the starting RB of the PUSCH transmission with repetition number, rep #, may be given in the following equation:

$$RB_{start}(rep\#) = \begin{cases} RB_{start} & (rep\# \bmod 2) = 0 \\ (RB_{start} + RB_{offset}) \bmod N_{BWP}^{size} & (rep\# \bmod 2) = 1 \end{cases}$$

The time allocation associated with the PUSCH repetition may be as discussed earlier, for example with respect to the examples of FIGS. 4B, 5B, and 5C.

For intra-slot FH with data splitting and data switching using the repetition format illustrated in FIG. 8C, the starting RB of PUSCH transmission with repetition number, rep #, may be defined by:

$$RB_{start}(rep\#) = \begin{cases} RB_{start} & \begin{array}{l}\text{First portion \& } (rep\# \bmod 2) = 0 \text{ or} \\ \text{Second portion \& } (rep\# \bmod 2) = 1\end{array} \\ (RB_{start} + RB_{offset}) \bmod N_{BWP}^{size} & \begin{array}{l}\text{Second portion \& } (rep\# \bmod 2) = 0 \text{ or} \\ \text{First portion \& } (rep\# \bmod 2) = 1\end{array} \end{cases}$$

Where rep # is the transmission number of the PUSCH repetition.

For intra-slot FH with data splitting and data switching using the repetition format illustrated in FIG. 8B, the starting RB may be defined using the above equation, with the following extra conditions:

For (rep # mod 2)=0, first portion is transmitted before the second portion; and For (rep # mod 2)=1, first portion is transmitted after the second portion.

For inter-slot FH, the starting RB of the PUSCH transmission with repetition number, rep #, may be defined by:

$$RB_{start}(rep\#) = \begin{cases} RB_{start} & \begin{array}{l}\text{all } rep\# \text{ in slot } n_s^\mu \text{ and} \\ (n_s^\mu \bmod 2) = 0\end{array} \\ (RB_{start} + RB_{offset}) \bmod N_{BWP}^{size} & \begin{array}{l}\text{all } rep\# \text{ in slot } n_s^\mu \text{ and} \\ (n_s^\mu \bmod 2) = 1\end{array} \end{cases}$$

It should be noted that in the examples of FIGS. 8A-8C, each of the first and second portions 415a, 415b is transmitted with a respective DMRS 410. This may introduce higher overhead compared to repetition formats where data splitting is not used. This extra overhead may be avoided by using DMRS sharing, discussed further below. Although data splitting is discussed here with reference to a transmission 405 being divided into first and second portions 415a, 415b, it should be understood that data splitting may enable a transmission 405 to be divided into more than two portions, which may be transmitted over at least two sets of frequency resources. Different portions of the transmission 405 may be transmitted over respective different sets of frequency resources, or at least two portions may be transmitted over a common set of frequency resources, for example.

Figure 9:
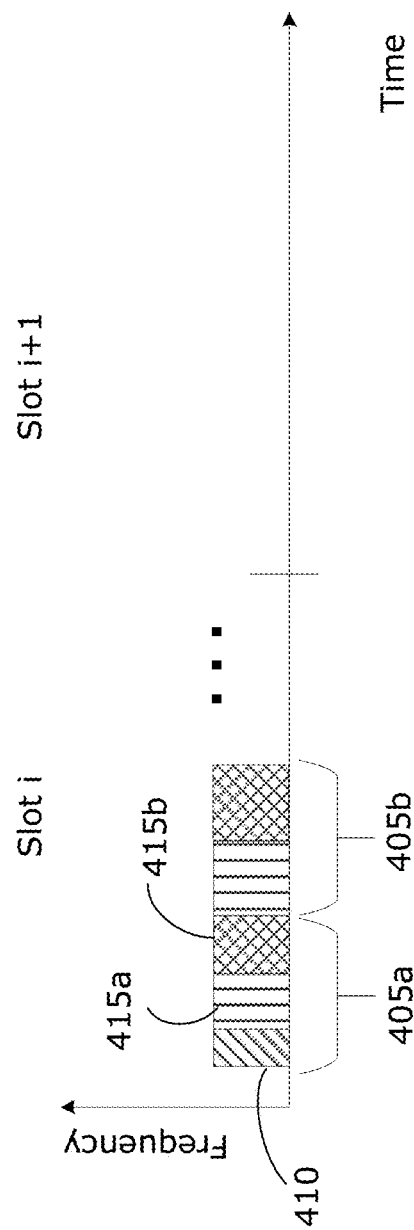
FIG. 9 is a schematic diagram illustrating an example of mini-slot based repetition with DMRS sharing, in accordance with an example of the present disclosure.

FIG. 9 is a schematic diagram illustrating an example disclosed repetition format, using mini-slot based PUSCH repetition, with DMRS sharing. In this example, when mini-slot based repetition is used, the first and second transmissions 405a, 405b are close together in time. It may be expected that the channel characteristics do not change significantly between the first transmission 405a and the second transmission 405b (e.g., in the case where the channel is slowly time variant, such as for low speed users). In such situations, the DMRS 410 may be transmitted only for the first transmission 405a for channel estimation, and it may be assumed that the channel estimation remains valid for the second transmission 405b, such that the DMRS 410 may be omitted from the second transmission 405b. This may be referred to as DMRS sharing between the two transmissions 405a, 405b. The use of DMRS sharing may help to reduce signaling overhead.

FIGS. 10A-10C are schematic diagrams illustrating examples of the disclosed repetition formats, using DMRS sharing with intra-slot FH. The repetition formats shown in FIGS. 10A-10C are similar to those of the conventional schemes shown in FIGS. 7A-7C, with FIG. 10A illustrating intra-slot FH without data switching, FIG. 10B illustrating intra-slot FH with time and frequency data switching, and FIG. 10C illustrating intra-slot FH with only frequency data switching. However, in the disclosed repetition formats of FIGS. 10A-10C, the DMRS 410 are omitted from the second transmission 405b. Although only two transmissions 405 are shown, it should be understood that the DMRS 410 may be omitted for one or more transmissions 405 following a prior transmission 405 having the DMRS 410. It should be noted that the DMRS 410 may be included (e.g., front-loaded) in the first transmission 405a for each set of frequency resources (e.g., DMRS 410 is included in the transmission of the first portion 415a using the first set of frequency resources, and also is included in the transmission of the second portion 415b using the second set of frequency resources), in order to obtain a channel estimation for each set of frequency resources. The DMRS sharing may enable the DMRS 410 to be omitted for one or more transmissions 405 following a prior transmission 405 that included the DMRS 410. The number of transmissions 405 for which DMRS sharing is valid (and for which DMRS 410 may be omitted) may depend on the channel characteristics (e.g., rate of channel variation), length of each transmission 405 and/or availability of resources for overhead, among other considerations. Generally, DMRS sharing may be used as long as the transmissions 405 are within the coherence time of the channel. Moreover, DMRS sharing can be applied to the example schemes illustrated in FIGS. 6A-6C and FIGS. 8A-8C.

Although FIGS. 9 and 10A-10C illustrate the transmission 405 that omit DMRS 410 as having longer transmissions of the first and second portions 415a, 415b, it should be noted that the figures are not necessarily shown to scale. That is, omission of the DMRS 410 does not necessarily result in more time resources being used for the remaining non-DMRS portions of the transmission 405. For example, omission of the DMRS 410 may simply result in a transmission 405 that is shorter in time overall. In other examples, a subsequent transmission 405 that omits DMRS 410 may use the same amount of time resources as a preceding transmission 405 that includes DMRS 410, so that the transmissions 405 have the same length.

It should be noted that, according to R15, if a PUSCH transmission 405 has an odd number of symbols, then when data splitting is used the first portion 415a has one more symbol than the second portion 415b. TS38.214 defines this in the case of intra-slot FH without repetitions, where the number of symbols in the first portion is given by:

$$\lfloor N_{symb}^{PUSCH,s}/2 \rfloor$$

and the number of symbols in the second portion is given by:

$$N_{symb}^{PUSCH,s} - \lfloor N_{symb}^{PUSCH,s}/2 \rfloor$$

where $N_{symb}^{PUSCH,s}$ is the length of the PUSCH transmission in OFDM symbols. For example, if the transmission 405 is five symbols long in total, then the first portion 415a has three symbols and the second portion 415b has two symbols.

DMRS sharing may be used in repetition formats where transmissions are permitted to cross slot boundaries (e.g., where the ED has little or no mobility). DMRS sharing may not be appropriate in cases where ED mobility is high.

Where DMRS sharing is used, the subsequent transmission(s) 405 that omit DMRS 410 may require a different set of resources to be specified (e.g., using another DCI signal) than the first transmission 405 that does include DMRS 410. This is because the resource elements that were allocated for transmitting the DMRS 410 are not required when the DMRS 410 is omitted in the subsequent transmission(s) 405. In some examples, rate matching using a circular buffer may be used. In some examples, the subsequent transmission(s) 405 (which omit DMRS 410) has the same time duration as the first transmission 405 (which includes DMRS 410).

Various examples of repetition formats have been described above with reference to the figures. It should be understood that different features of different example repetition formats may be used in combinations not explicitly shown. For example, mini-slot repetition may be used with a predefined gap when crossing a slot boundary, together with intra-slot FH and DMRS sharing (e.g., a combination of the example repetition formats shown in FIGS. 5C, 8A and 10A). Other such combinations may be used, as appropriate.

Some example signaling mechanisms are now discussed, which may be used to notify an ED of the repetition format to be used for transmission of PUSCH repetitions (e.g., including any of the schemes discussed above). Possible signaling mechanisms may include dynamic signaling, or semi-static signaling, or a combination thereof, with or without the use of standardized codes. In the present disclosure, use of standardized codes means that certain rules and/or ED behaviors are defined in a standard specification (e.g., the RV table in section 6.1.2.1. in TS38.214 V15.2.0 (2018-06), which specifies the redundancy version when aggregationFactorUL is greater than 1). Such signaling may be used to inform an ED whether PUSCH transmissions are to be repeated on a slot or mini-slot basis; to inform an ED whether data splitting is used; to inform an ED whether data switching is used; and/or to inform an ED whether inter- or intra-slot FH hopping is used; among other possibilities.

In some examples, dynamic signaling to notify an ED of the repetition format may be implemented. Dynamic signaling refers to signaling that is transmitted frequently, for example at every time slot or more frequently. Generally, DCI signals may be used for dynamic signaling. Dynamic signaling may be used to indicate to an ED whether the repetition format uses mini-slot based or slot-based repetition, and with or without intra-slot or inter-slot FH, for example. A modification of existing DCI formats (e.g., modification of DCI format 0_0 or DCI format 0_1, such as adding more field, adding more bits in existing fields, or other such modification) may be used to implement the dynamic signaling, or RRC signaling may be used.

For example, in R15, RRC signaling may be used to indicate mode 1 (intra-slot) or mode 2 (inter-slot) FH. Similarly, DCI format 0_0 and DCI format 0-1 each include a frequency hopping flag that may be used to indicate if FH should be used for PUSCH transmissions.

R15 already supports slot-based repetition. However, additional signaling formats may be needed to support mini-slot based repetition. The present disclosure describes some examples for modifying existing signaling formats to enable the disclosed mini-slot based repetition repetition format to be implemented.

In one example, an additional field (e.g., an additional DCI field in existing DCI formats 0_0 or 0_1, or other uplink grants) may be added to notify the ED whether the PUSCH transmissions are to be transmitted using a slot-based or mini-slot based (also referred to as non-slot based) repetition. An ED may be configured (e.g., the memory of the ED includes appropriate instructions used by the processing unit) to recognize and process this additional field. For example, a mini-slot based repetition flag may be added, in which a '1' value indicates mini-slot based repetition is to be used, and '0' value indicates slot-based repetition is to be used. Further, the existing frequency hopping flag in DCI formats 0_0 and 0_1 may be modified to indicate various FH modes dynamically. For example, the modified frequency hopping flag may be two bits long and may indicate FH modes according to the following table:

| Bit value | Description |
| --- | --- |
| 00 | No FH |
| 01 | Intra-slot FH with data splitting (mode 1a) |
| 10 | Intra-slot FH with no data splitting (mode 1b) |
| 11 | Inter-slot FH (mode 2) |

It should be noted that the indication of intra-slot FH with no data splitting may not be applicable where there is no mini-slot repetition. An ED may not expect an indication to use intra-slot FH with no data splitting, if mini-slot repetition is not used. Further, an ED may not expect an indication to use inter-slot FH if there is no repetition being transmitting in a subsequent slot (e.g., all repetitions are transmitted in the same slot, or there is no repetition). In some examples, if intra-slot FH with no data splitting is indicated, and slot-based repetition is also indicated at the same time, the intra-slot FH with no data splitting indication may take priority over the slot-based repetition indication, and the ED may use mini-slot based repetition with intra-slot FH with no data splitting. In other examples, the slot-based repetition indication may take priority over the intra-slot FH with no data splitting indication, and the ED may use slot-based repetition and intra-slot FH with data splitting. In some examples, if the ED receives an indication of the repetition format via dynamic signal, and also an indication of a possibly conflicting repetition format via semi-station signaling (via higher layer signaling), the indication via dynamic signaling may have priority over the indication via semi-static signaling, or vice versa.

A compact DCI format for uplink grant may be similarly adapted to indicate the repetition format to be used. A compact DCI is a DCI format that has a smaller payload size, compared to conventional DCI formats, by using fewer fields and/or using fewer bits per field, thus having fewer overall payload bits.

In another example, indication of mini-slot based repetition may be provided implicitly using existing fields of existing signaling formats, without adding a new field. Such implicit signaling may be used to indicate FH (e.g., with or without data splitting for intra-slot FH) and/or with or without data switching when data splitting is to be used. For example, existing DCI formats include a time domain resource assignment field, which is used to indicate the time resource allocation for a PUSCH transmission based on a list configured in the higher layer parameter pdsch-Allocation-List, including the PUSCH mapping type to be used. An ED may be configured to recognize that if a certain PUSCH mapping type (e.g., mapping type B as defined in Subclause 6.4.1.1.3 of TS 38.211 V15.2.0) is indicated, then mini-slot based repetition is to be used. In another example, the cyclic redundancy check (CRC) field of existing DCI formats may be scrambled using a unique identifier (e.g., a unique radio network temporary identifier (RNTI)) to indicate that mini-slot based repetition is to be used. The ED may be configured to check the CRC field using the RNTI unique to mini-slot based repetition, and if the CRC field is successfully unscrambled using the unique RNTI, then the ED recognizes that mini-slot based repetition is to be used. Such implicit signaling (e.g., using indication of mapping type B or using a unique RNTI) may also be used to indicate the type of FH to be used (e.g., with or without data splitting in intra-slot FH).

RRC signaling may also be modified to indicate slot-based or mini-slot based (also referred to as non-slot based) repetition. For example, a parameter "repetitionType" may be added in PUSCH-TimeDomainResourceAllocation configuration in RRC, such as:
repetitionType ENUMERATED {slot-based, non-slot-based}

In some examples, if a configuration (for example, in PUSCH-TimeDomainResourceAllocation, or configured by DCI or some other method) indicates the resource mapping type A, the ED may not be configured with non-slot based repetition type. This is because PUSCH with mapping type A may start only at the first symbol of each slot. In some examples, if a configuration (for example, in PUSCH-TimeDomainResourceAllocation, or configured by DCI or some other method) indicates the resource mapping type B, the ED may be configured with either slot-based or non-slot based repetition type. This is because PUSCH with mapping type B may start in any symbol of the slot as long as the PUSCH can fit in the slot.

Because there is a list of PUSCH-TimeDomainResourceAllocation that is configured by RRC (PUSCH-TimeDomainAllocationList), and which can be selected dynamically (e.g., by DCI signaling), the repetition type may be thus selected dynamically. Currently, there are 16 possible different PUSCH-TimeDomainResourceAllocation that are selectable in PUSCH-TimeDomainAllocationList, so that four bits in a DCI signal is used to indicate the selected PUSCH-TimeDomainResourceAllocation; this may be modified to accommodate the addition of the repetitionType parameter. In some examples, higher layer signaling may include the use of RRC signals or RRC signals with media access control (MAC) Control Element (MAC CE). In some examples, a set of configurations may be configured by RRC signaling and then a MAC CE (which is typically more frequently transmitted than RRC signaling) is used as an activation command that can activate a subset of the configurations. Dynamic signaling (e.g., DCI signaling) may be used to dynamically select a configuration from the set or subset of configurations. Moreover, the list of time domain allocations for PUSCH transmissions can be specified in a table in the standard specification and may be used when RRC configuration is not yet established or is reconfigured. Again, a bit field in a DCI signal may be used to dynamically select the PUSCH time domain allocation from the specified list in the table. For example, the existing table defined in R15 TS38.214 is as follows:

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

This table may be modified by adding rows and columns as follows:

| Row index | PUSCH mapping type | $K_3$ | S | L | Repetition type (Added column) |
|---|---|---|---|---|---|
| 1 | Type A | j | 0 | 14 | Slot-based if not specified |
| 2 | Type A | j | 0 | 12 | |
| 3 | Type A | j | 0 | 10 | |
| 4 | Type B | j | 2 | 10 | |
| 5 | Type B | j | 4 | 10 | |
| 6 | Type B | j | 4 | 8 | |
| 7 | Type B | j | 4 | 6 | |
| 8 | Type A | j + 1 | 0 | 14 | |
| 9 | Type A | j + 1 | 0 | 12 | |
| 10 | Type A | j + 1 | 0 | 10 | |
| 11 | Type A | j + 2 | 0 | 14 | |
| 12 | Type A | j + 2 | 0 | 12 | |
| 13 | Type A | j + 2 | 0 | 10 | |
| 14 | Type B | j | 8 | 6 | |
| 15 | Type A | j + 3 | 0 | 14 | |
| 16 | Type A | j + 3 | 0 | 10 | |
| 17 | Type B | j | 2 | 4 | Non-slot-based |
| 18 | Type B | j | 4 | 4 | Non-slot-based |

As discussed above, in some embodiments a Type A resource mapping should not be specified or signaled or configured with non-slot based repetition type.

In some examples, instead of adding rows (which necessitates using more bits in DCI signaling), the number of rows may be kept the same and instead existing rows are replaced with the new rows.

In some cases, the requirements for latency may be less stringent (even where URLLC is used), such that slot-based repetition may be suitable. The use of explicit or implicit signaling, for example as described above, may enable dynamic selection between mini-slot based and slot-based repetition.

In some examples, semi-static signaling may be used together with or in place of dynamic signaling, to indicate to the ED the repetition format to be used. Semi-static signaling may be defined in comparison with dynamic signaling that is operating in every time slot. For example, semi-static signaling may refer to signals that are transmitted at longer time intervals (e.g., 200 or more time slots), and may be transmitted periodically or non-periodically. Semi-static signaling may be used where configuration may be initiated and updated only occasionally. Semi-static signaling may be performed using, for example, broadcast signaling, RRC signaling, higher layer signaling, or other non-DCI signaling.

In some examples, a higher-layer signal (e.g., RRC signal) may be used to set the PUSCH configuration (e.g., set the PUSCH-Config parameter in RRC signal) to indicate whether PUSCH transmissions are to be sent using slot-based or non-slot based (or mini-slot based) repetition. For example, the PUSCH configuration may have a PUSCH-repetition parameter that may be set as slot or non-slot (e.g., PUSCH-repetition ENUMERATED {slot, non-slot}). In some examples, the PUSCH-repetition parameter may be configured as PUSCH-repetition ENUMERATED {non-slot} based on the RRC parameter configuration convention, where only the non-default value is specified as the choice in the ENUMERATED parameter. In some examples, the slot-based repetition may not be the default value.

In some examples, if a PUSCH mapping type A (defined in sub-clause 6.4.1.1.3 of TS 38.211 V15.2.0) is signaled to a ED (e.g. via a time domain resource assignment field in DCI), the ED may use slot-based repetition and the corresponding intra-slot or inter-slot FH if configured, even if the repetition type is configured to be non-slot based and/or a specific RNTI is used. In some examples, if UE is configured by RRC or signaled to use mini-slot based repetition (e.g. implicit or explicit dynamic signaling), it is not expected to be scheduled with PUSCH mapping type A and/or it is expected to be scheduled with PUSCH mapping type B. In some examples, if a PUSCH mapping type B is signaled to a ED, then the repetition type used follows the RRC configuration of repetition type (e.g. slot or non-slot) and/or specific RNTI (for slot or non-slot), where the RRC configuration may take priority over specific RNTI, or the specific RNTI take priority over RRC configuration.

In some examples, Higher-layer semi-static signaling may be used together with dynamic signaling. For example, RRC signaling may be used to define certain configurations (e.g., slot-based repetition, non-slot based repetition, number of repetitions), which may be indexed. A DCI signal may include a field (e.g., by modifying existing DCI formats 0_0 or 0_1 to include an additional field) indicating the index of the RRC-defined configuration that should be used by the ED. The ED may be configured to store the indexed RRC-defined configurations in a table in memory, for example. When the ED receives a DCI signal, the ED may then process the DCI signal to determine the indicated index and use the index to look up the correct configuration to use for PUSCH transmissions.

RRC parameter signaling may be used to indicate whether there is a field added to DCI format 0_0 and/or format 0_1 (format 1_0 and/or 1_1 for downlink signals). For example, a parameter "repetitionType-PresentInDCI" may be added under the configuration of ControlResourceSet by RRC signaling, for example:

repetitionType-PresentInDCIENUMERATED {enabled}

If the parameter repetitionType-PresentInDCI is enabled (e.g., bit value is 1), then this indicates there is an added bit in the DCI format that is used to indicate whether the repetition type is slot-based or non-slot based. The bit in the DCI format may override RRC signaling in PSUCH-Config, for example.

When the ED receives a DCI signal using the adapted format, the ED may recognize the added bit that indicates the repetition type used. The instruction encoded by the added bit in the DCI signal may override any RRC configuration in PUSCH-Config, for example. If the ED does not receive explicit configuration instructions for repetition type (e.g., no configuration using PUSCH-repetition parameter, no added bit in DCI signal, or when there is no RRC configuration yet), and the ED is to transmit repetitions, then the ED may use a default repetition format for transmitting PUSCH repetitions. For example, the ED may, by default, use slot-based repetition. Alternatively, the ED may, by default, use mini-slot based repetition if the RNTI assigned to the ED is a URLLC-RNTI (also referred to as new-RNTI or MCS-C-RNTI in the context of NR) or resource allocation type B is used.

Existing semi-static signaling formats (e.g., higher-layer signaling such as RRC) may be modified to enable indication of whether intra-slot FH is to be used with or without data splitting. For example, the PUSCH-Config parameter in RRC signaling may be modified such that the frequency hopping parameter includes additional modes for data splitting, such as:

frequencyHopping ENUMERATED {mode1withdatasplitting, mode1withoutdatasplitting, mode2} or frequencyHopping ENUMERATED {mode1a, mode1b, mode2}

In another example, semi-static signaling and/or dynamic signaling may be used with standardization, to indicate the type of intra-slot FH mode. For example, the standard specification may define that a certain FH mode means a certain type of intra-slot FH (e.g., that mode 1 means intra-slot FH with no data splitting, or intra-slot FH with data splitting and without data splitting, or intra-slot FH with data splitting and data switching). Then the frequency hopping parameter in the PUSCH-Config parameter may not need to be modified. An existing RRC signal format may be used to indicate mode 1 or mode 2 FH (with mode 1 or mode 2 refers to intra-slot FH or inter-slot FH, respectively), and an existing DCI signal format may be used to indicate whether FH is used or not used. Then, the ED may follow the standard specification when configured or signaled with a certain type of FH (e.g. intra-slot or inter-slot) and/or certain type of repetition (e.g. slot-based or non-slot based).

Generally, where higher layer signaling is used to indicate the repetition format or the configuration of the repetition format, the higher layer signaling may include the use of RRC signals with or without use of MAC CE. In examples where MAC CE is used for signalling a repetition format, the RRC signalling may be used to define a set of configurations for different repetition formats, and a MAC CE may be used to signal activation of a subset of the configurations from the defined set of configurations. Further, dynamic signalling may be used to dynamically select a specific configuration from the subset of configurations. In some examples, the configuration of other schemes or set of parameters may be considered.

Figure 11:
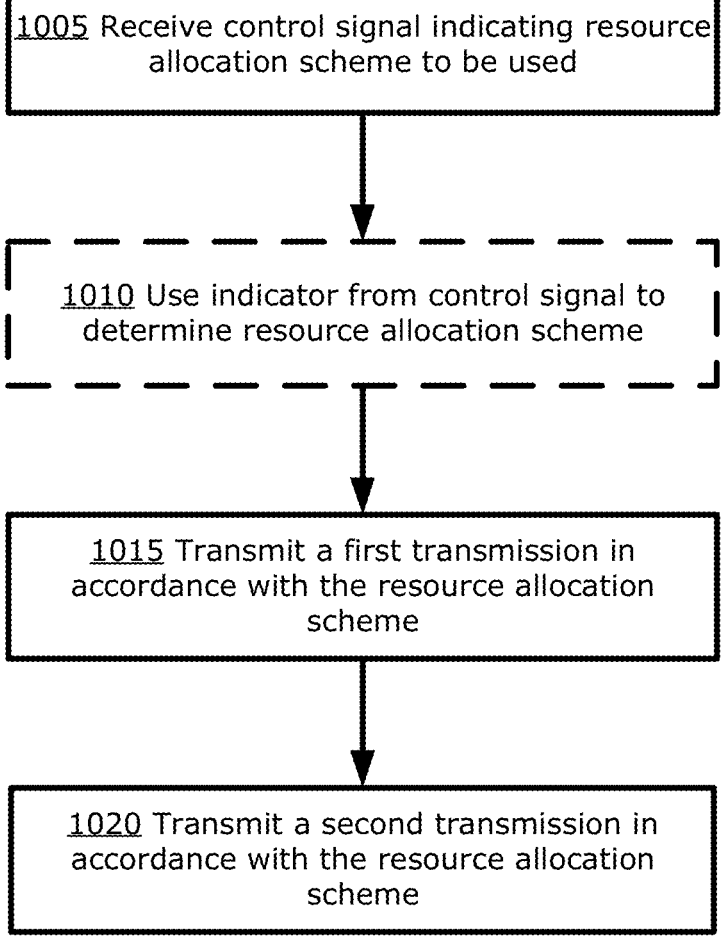
FIG. 11 is a flowchart of an example method for transmitting repetitions, in accordance with an example of the present disclosure.

FIG. 11 is a flowchart illustrating an example method 1000 that may be used (e.g., by an ED) to implement examples described herein. The method 1000 may be used to transmit k repetitions, for example over an uplink channel (e.g., PUSCH). Although described below in the context of an ED, the method 1000 may also be used by a base station for downlink transmissions (e.g., over PDSCH), for example.

At 1005, the ED receives a control signal (e.g., dynamic and/or semi-static signal as discussed above) indicating a repetition format to be used. The ED may process the control signal as discussed above. For example, the control signal may be a DCI signal.

Optionally, at 1010, if the control signal provides an indicator (e.g., an index) of the repetition format to use, the ED may use the indicator to determine (e.g., using a look-up table stored in memory) the specific repetition format.

At 1015, the ED transmits to a recipient device a first transmission of the k repetitions in accordance with the repetition format. At 1020, the ED transmits the second transmission in accordance with the repetition format.

In some examples, where early termination is enabled (e.g., as discussed further below), the ED may, in response to receiving an acknowledgement from the recipient, end transmission before all k repetitions have been transmitted.

For example, the repetition format may use mini-slot based repetition with intra-slot FH. In such a case, the first transmission of the k repetitions may be sent starting from a first symbol within a first slot, and using a first set of frequency resources. The second transmission may then be sent following the first transmission and starting from a second symbol within the same first slot, and using a second set of frequency resources.

In another example, the repetition format may use mini-slot based repetition with inter-slot FH. In such a case, the first and second transmissions may be sent within a first slot, and using a first set of frequency resources. Another transmission may be sent in a second slot following the first slot, and using a second set of frequency resources.

In another example, the repetition format may use mini-slot based repetition with intra-slot FH and data splitting. In such a case, sending the first transmission may involve sending the first and second portions of the first transmission, each portion being sent using different first and second sets of frequency resources. The second transmission may be sent within the same slot, with the first and second portions of the second transmission being sent using different first and second sets of frequency resources. Where data switching is used, the first and second portions of the second transmission may be sent using a different pattern of time and/or different frequency resources than the first transmission.

The repetition format may also define whether a transmission may cross the slot boundary. Where a transmission is not permitted to cross the slot boundary, a transmission that cannot be completely sent within a slot may be instead be sent in a following slot (e.g., after a predetermined time gap, or at a first symbol in the following slot).

Where the repetition format permits DMRS sharing, sending the first transmission may include sending the front-loaded DMRS, and a subsequent transmission that uses the same frequency resources as the first transmission may omit the DMRS.

In examples disclosed herein, RV sequences used in PUSCH repetition, as defined in R15, which can also be considered as retransmission, may be applicable for both slot-based and mini-slot based (or non-slot based) repetition schemes.

In some examples, certain restrictions may be applied to the use of mini-slot based repetition. For example, mini-slot based repetition may be used when the indicated starting symbol within a slot (e.g., as indicated by DCI signaling) is not later than a certain symbol and/or the transmission length is not longer than a certain symbol length. Such restrictions may be applied in order to avoid the use of mini-slot based repetition when little or no latency benefits may be expected compared to slot-based repetition (e.g., because the transmission length is such that repetition within a single slot is unlikely or not possible).

Examples of the present disclosure may also accommodate the case where the number of repetitions is different between slots. For example, where slot i has one PUSCH transmission and slot i+1 has three PUSCH transmissions. In such cases, an example repetition format may specify that intra-slot FH with data splitting may be used when there is only one PUSCH transmission in a slot, and all other repetitions of the PUSCH transmission should also use intra-slot FH with the same pattern of data splitting.

Examples of the present disclosure may be applicable to uplink grant-free transmissions. For example, in grant-free PUSCH, there is no scheduling request (SR) and no uplink grant required. Examples of the disclosed repetition formats (e.g., using mini-slot repetition, with or without intra-slot or inter-slot FH, or using slot-based repetition, among others) can be applied to grant-free PUSCH transmissions. Example signaling, as described above, may be used to indicate to the ED the repetition format to be used for transmission. For example, semi-static signaling (e.g., higher layer RRC signaling) may be used to indicate slot-based or mini-slot based repetition. Higher layer signaling may also be used to indicate intra-slot FH with or without data splitting and/or with or without data switching, or inter-slot FH. The ED may not expect to be configured for intra-slot FH without data splitting, if not using mini-slot based repetition. In some embodiments, a Type A resource mapping should not be configured with non-slot based repetition type.

Although described in the context of PUSCH transmissions, it should be understood that examples of the present disclosure (e.g., including mini-slot based repetition, with or without intra-slot (with or without data splitting) or inter-slot FH, or slot-based repetition) may also be applicable to repetition of other uplink or downlink transmissions (e.g., PDSCH transmissions). For example, the disclosed methods may be performed by a base station or other network node.

Dynamic and/or semi-static signaling may be used to indicate the repetition format to be used for PDSCH transmissions. For example, for downlink grant, DCI formats 1_0 or 1_1 (or compact DCI format) may be modified, similar to that described above for DCI formats 0_0 and 0_1.

Higher layer signaling may also be adapted to indicate the repetition format to be used for PDSCH transmissions, similarly to that described above in the context of PUSCH transmissions. For example, the PDSCH-Config parameter in RRC signaling may include an added frequencyHopping parameter and an added frequencyHoppingOffsetLists parameter as follows:
frequencyHopping ENUMERATED {mode1, mode2}
frequencyHoppingOffsetListsSEQUENCE (SIZE(1 . . . 4)) OF INTEGER (1 . . . maxNrofPhysicalResourceBlocks−1)

The use of intra-slot FH with mini-slot repetition for PDSCH transmissions may be implemented by modifying the equation in section 6.3 TS38.214 V15.2.0 (2018-06), which describes the starting RB for PUSCH transmissions with intra-slot FH. For example, for an intra-slot FH for slot-based repetition, the starting RB for each frequency hop is defined according to TS38.214 section 6.3 as follows:
The starting RB during in each hop is given by:

$$RB_{start} = \begin{cases} RB_{start} & \text{First hop} \\ (RB_{start} + RB_{offset}) \mod N_{BWP}^{size} & \text{Second hop} \end{cases},$$

and for inter-slot FH for slot-based repetition as follows:
In case of inter-slot frequency hopping, the starting RB during slot $n_s^\mu$ is given by:

$$RB_{start}(n_s^\mu) = \begin{cases} RB_{start} & n_s^\mu \mod 2 = 0 \\ (RB_{start} + RB_{offset}) \mod N_{BWP}^{size} & n_s^\mu \mod 2 = 1 \end{cases},$$

These two above equations are used for FH in slot-based repetition. For FH where mini-slot based repetition is used, the previously-described equations for PUSCH-config may be used.

Examples of the present disclosure may be applicable to TDD transmissions. In TDD transmissions, certain symbols in a slot may be assigned for uplink transmission only, downlink transmission only, or flexible (i.e., can be used for uplink or downlink transmission), according to a slot format indicator (SFI). PUSCH transmissions may be transmitted only over uplink or flexible symbols. If, according to a repetition format (e.g., mini-slot repetition with or without FH) a PUSCH transmission or any portion of a PUSCH transmission is expected to be transmitted in conflict with SFI assignments, then the PUSCH transmission may be omitted, or postponed until the next uplink or flexible symbol. For example, when the ED determines, using the procedure for determining slot configuration (e.g., as defined in sub-clause 11.1 of TS38.213 V15.2.0 (2018-06), which defines slot configuration), that a symbol of a slot allocated for a PUSCH transmission is a downlink symbol, then the transmission on that slot (in the case of multi-slot PUSCH transmission or slot-based PUSCH repetition) or a set of downlink symbols in that slot (multi-mini-slot PUSCH transmission or mini-slot based PUSCH repetition) may be omitted, rate matched or punctured to fit in the available uplink symbols in the slot, or and the transmission is resumed on the next available uplink opportunity. Where a transmission is omitted, the counting of the corresponding repetition number may also be skipped (e.g., if the 3rd transmission falls under a set of downlink symbols/slot and is omitted, then the next transmission is counted as the 4$^{th}$ transmission), or the corresponding repetition number may be used for the next successful transmission (e.g., if the 3rd transmission is omitted, then the next transmission is counted as the 3rd transmission instead).

Examples of the present disclosure may be implemented with signaling mechanisms such as explicit ACK, early termination, and preconfigured gap between repetitions, among other possibilities. Early termination means that the transmissions are terminated before the scheduled k repetitions are all sent (i.e., fewer than k repetitions are sent). Early termination may be used to save system resources. When a network node (e.g., receiving node such as receiving base station in uplink or receiving ED in downlink) has correctly decoded the transmitted data, the network node (or ED) may transmit an explicit acknowledgement (e.g., ACK message) back to the transmitting node (e.g., transmitting ED or transmitting base station). Upon receipt of the acknowledgement, the ED (or the base station) may stop the on-going transmission before completing the k repetitions. This may help to save resources and improve link efficiency. The capability for early termination may also help to avoid traffic blocking, because other traffic does not have to wait until all of the configured k repetitions are completed. Where explicit ACK and early termination is implemented, repetitions may be transmitted using slot-based repetitions, or with a time gap (e.g., preconfigured number of symbols) between transmissions, to allow for ACK feedback from the network to be received before k repetitions have been transmitted. In some examples, this may be used for some types of URLLC where latency requirements are not very stringent. In some examples, where explicit ACK and early termination is implemented, repetitions may be transmitted using non-slot-based repetitions. It is understood that FH may or may not be used.

Examples of the present disclosure may also accommodate possible collision with DMRS.

In various examples disclosed herein, different repetition formats are described for performing repetitions of PUSCH transmissions, for example in accordance with URLLC requirements.

In some examples, different repetitions may use different resource mapping for the PUSCH transmission. For example, the time and/or frequency resources used for one repetition may be different from the time and/or frequency resources used for the next repetition.

The present disclosure describes example signaling mechanisms that may be used to provide information to an ED to enable the ED to send transmissions (e.g., k repetitions of PUSCH transmissions) according to the various repetition formats discussed herein. For example, the disclosed signaling mechanisms may provide information to cause the ED to send transmissions using mini-slot based repetition, intra-slot FH, data splitting and/or data switching, among other options.

In some aspects, the present disclosure describes a method for transmitting k repetitions of a transmission over a channel, the k repetitions including an initial instance of the transmission. The method includes: sending at least a first repetition and a second repetition of the k repetitions over the channel, the first and second repetitions being sent within a first slot, and using a first set of frequency resources; and sending at least one other repetition of the k repetitions over the channel, the at least one other repetition being sent in a second slot following the first slot, and using a second set of frequency resources.

In some aspects, the present disclosure describes a method for transmitting k repetitions of a transmission over a channel, the k repetitions including an initial instance of the transmission. The method includes sending a first repetition of the k repetitions over the channel by: sending a first portion of the first repetition over the channel; and sending a second portion of the first repetition; wherein the first portion and the second portion are sent within a first slot, using first and second sets of frequency resources. The method also includes sending a second repetition of the k repetitions over the channel by: sending a first portion of the second repetition over the channel; and sending a second portion of the second repetition; wherein the first portion and the second portion are sent within the first slot, using the first and second sets of frequency resources.

In any of the examples, sending the first repetition may include: sending the first portion of the first repetition using a first set of frequency resources; and sending the second portion of the first repetition using a second set of frequency resources. Sending the second repetition may include: sending the first portion of the second repetition using the second set of frequency resources; and sending the second portion of the second repetition using the first set of frequency resources.

In any of the examples, sending the first repetition may include: sending the first portion of the first repetition before sending the second portion of the first repetition. Sending the second repetition may include: sending the second portion of the second repetition before sending the first portion of the second repetition.

In any of the examples, a control signal may be a downlink control information (DCI) signal.

In any of the examples, a control signal may be a radio resource control (RRC) signal.

In any of the example, the method may also include: receiving an acknowledgement from a recipient device; and terminating transmission before all k repetitions have been transmitted.

In some aspects, the present disclosure describes a method for transmitting k repetitions of a transmission over a channel, the k repetitions including an initial instance of the transmission. The method includes: sending a first repetition of the k repetitions over the channel, using a first set of frequency resources, wherein the first repetition includes a reference signal for channel estimation; and sending a second repetition of the k repetitions over the channel, following the first repetition, using the first set of frequency resources, wherein the second repetition omits the reference signal.

In some aspects, the present disclosure describes an electronic device (ED) that includes: a transmitter for sending transmission over a channel; and a processing unit coupled to the transmitter. The processing unit is configured to execute instructions to cause the ED to perform any of the preceding methods.

In some aspects, the present disclosure describes a base station that includes: a transmitter for sending transmission over a channel; and a processing unit coupled to the transmitter. The processing unit is configured to execute instructions to cause the base station to perform any of the preceding methods.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a computer program product or software product. A suitable software product may be stored in a pre-recorded storage device or other similar non-volatile or non-transitory computer readable medium, including DVDs, CD-ROMs, USB flash disk, a removable hard disk, or other storage media, for example. In some examples, the software product is downloadable from a server and can be installed on a processing system, such as processing system 200. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for transmitting k repetitions of a transmission of first data, the k repetitions including an initial instance of the transmission, the method comprising:
   receiving, from a base station, a control signal indicating a repetition format;
   sending a first repetition of the k repetitions of the transmission of the first data over a physical uplink shared channel (PUSCH) starting from a first symbol within a first slot and using a first set of frequency resources starting with a first starting resource block (RB), wherein the first repetition corresponds to n=0; and
   sending, following the first repetition of the transmission of the first data, a second repetition of the k repetitions of the transmission of the first data over the PUSCH starting from a second symbol within the first slot and using a second set of frequency resources different from the first set of frequency resources, wherein the second set of frequency resources starts with a second starting RB, and wherein the second repetition corresponds to n=1,
   wherein all repetitions with even-numbered n use the first set of frequency resources starting with the first starting RB based on the repetition format indicated by the control signal, and all repetitions with odd-numbered n use the second set of frequency resources starting with the second starting RB based on the repetition format indicated by the control signal, wherein an i-th repetition of the k repetitions corresponds to n=i−1, i is an integer greater than 0 and less than or equal to k, n is an integer greater than or equal to 0 and less than k, and k is an integer greater than 1, and wherein the first repetition is front-loaded with a demodulation reference signal (DMRS) and is sent over the first set of frequency resources, and wherein a subsequent repetition of the k repetitions that is sent using the first set of frequency resources omits the DMRS.

2. The method of claim 1, the sending the k repetitions of the transmission over the PUSCH comprising:
sending a third repetition over the PUSCH, following the second repetition and starting from a third symbol within the first slot, wherein a portion of the third repetition is sent within a second slot following the first slot.

3. The method of claim 1,
wherein resource mapping type B is used, according to a configuration parameter, the method further comprising: transmitting the first and second repetition in accordance with a repetition parameter, or
wherein resource mapping type A is used, according to the configuration parameter, the method further comprising:
when the repetition parameter indicates that the first and second repetitions are to be transmitted within the same slot, ignoring the repetition parameter and transmitting the first and second repetitions in different slots.

4. An apparatus comprising:
at least one processor; and
a non-transitory computer readable storage medium storing programming, the programming including instructions that, when executed by the at least one processor, cause the apparatus to perform operations for transmitting k repetitions of a transmission of first data, the k repetitions including an initial instance of the transmission, the operations including:
receiving, from a base station, a control signal indicating a repetition format;
sending a first repetition of the k repetitions of the transmission of the first data over a physical uplink shared channel (PUSCH) starting from a first symbol within a first slot and using a first set of frequency resources starting with a first starting resource block (RB), wherein the first repetition corresponds to n=0; and
sending, following the first repetition of the transmission of the first data, a second repetition of the k repetitions of the transmission of the first data over the PUSCH starting from a second symbol within the first slot and using a second set of frequency resources different from the first set of frequency resources, wherein the second set of frequency resources starts with a second starting RB, and wherein the second repetition corresponds to n=1,
wherein all repetitions with even-numbered n use the first set of frequency resources starting with the first starting RB based on the repetition format indicated by the control signal, and all repetitions with odd-numbered n use the second set of frequency resources starting with the second starting RB based on the repetition format indicated by the control signal, wherein an i-th repetition of the k repetitions corresponds to n=i−1, i is an integer greater than 0 and less than or equal to k, n is an integer greater than or equal to 0 and less than k, and k is an integer greater than 1, and
wherein the first repetition is front-loaded with a demodulation reference signal (DMRS) and is sent over the first set of frequency resources, and wherein a subsequent repetition of the k repetitions that is sent using the first set of frequency resources omits the DMRS.

5. The apparatus of claim 4, the sending the k repetitions of the transmission over the PUSCH comprising:
sending a third repetition of the k repetitions over the PUSCH by:
determining that the third repetition cannot be completely transmitted within the first slot; and
sending the third repetition in a second slot following the first slot.

6. The apparatus of claim 4, the sending the k repetitions of the transmission over the PUSCH comprising:
sending a third repetition of the k repetitions over the PUSCH by:
sending the third repetition over the PUSCH, following the second repetition and starting from a third symbol within the first slot, wherein a portion of the third repetition is sent within a second slot following the first slot.

7. A method for receiving k repetitions of a transmission of first data, the k repetitions including an initial instance of the transmission, the method comprising:
sending, to a user equipment (UE), a control signal indicating a repetition format;
receiving a first repetition of the k repetitions of the transmission of the first data over a physical uplink shared channel (PUSCH) starting from a first symbol within a first slot and using a first set of frequency resources starting with a first starting resource block (RB), wherein the first repetition corresponds to n=0; and
receiving, following the first repetition of the transmission of the first data, a second repetition of the k repetitions of the transmission of the first data over the PUSCH starting from a second symbol within the first slot and using a second set of frequency resources different from the first set of frequency resources, wherein the second set of frequency resources starts with a second starting RB, and wherein the second repetition corresponds to n=1,
wherein all repetitions with even-numbered n use the first set of frequency resources starting with the first starting RB based on the repetition format indicated by the control signal, and all repetitions with odd-numbered n use the second set of frequency resources starting with the second starting RB based on the repetition format indicated by the control signal, wherein an i-th repetition of the k repetitions corresponds to n=i−1, i is an integer greater than 0 and less than or equal to k, n is an integer greater than or equal to 0 and less than k, and k is an integer greater than 1, and
wherein the first repetition is front-loaded with a demodulation reference signal (DMRS) and is sent over the first set of frequency resources, and wherein a subsequent repetition of the k repetitions that is sent using the first set of frequency resources omits the DMRS.

8. The method of claim 7, the receiving the k repetitions of the transmission over the PUSCH comprising:
receiving a third repetition over the PUSCH, following the second repetition and starting from a third symbol within the first slot, wherein a portion of the third repetition is received within a second slot following the first slot.

9. The method of claim 7, wherein the first starting RB and the second starting RB meet:

$$RB_{start}(n) = \begin{cases} RB_{start} & (n \bmod 2) = 0 \\ (RB_{start} + RB_{offset}) \bmod N_{BWP}^{size} & (n \bmod 2) = 1 \end{cases}$$

wherein $RB_{start}(n)$ represents a starting RB of a repetition associated with n, $RB_{start}$ represents the first starting RB, $(RB_{start}+RB_{offset}) \bmod N_{BWP}^{size}$ represents the second starting RB, and $RB_{offset}$ is an offset configured by higher layer signaling, and $N_{BWP}^{size}$ is the size of a BWP.

10. An apparatus comprising:
   at least one processor; and
   a non-transitory computer readable storage medium storing programming, the programming including instructions that, when executed by the at least one processor, cause the apparatus to perform operations for receiving k repetitions of a transmission of first data, the k repetitions including an initial instance of the transmission, the operations including:
      sending, to a user equipment (UE), a control signal indicating a repetition format;
      receiving a first repetition of the k repetitions of the transmission of the first data over a physical uplink shared channel (PUSCH) starting from a first symbol within a first slot and using a first set of frequency resources starting with a first starting resource block (RB), wherein the first repetition corresponds to n=0; and
      receiving, following the first repetition of the transmission of the first data, a second repetition of the k repetitions of the transmission of the first data over the PUSCH starting from a second symbol within the first slot and using a second set of frequency resources different from the first set of frequency resources, wherein the second set of frequency resources starts with a second starting RB, and wherein the second repetition corresponds to n=1,
      wherein all repetitions with even-numbered n use the first set of frequency resources starting with the first starting RB based on the repetition format indicated by the control signal, and all repetitions with odd-numbered n use the second set of frequency resources starting with the second starting RB based on the repetition format indicated by the control signal, wherein an i-th repetition of the k repetitions corresponds to n=i−1, i is an integer greater than 0 and less than or equal to k, n is an integer greater than or equal to 0 and less than k, and k is an integer greater than 1, and
      wherein the first repetition is front-loaded with a demodulation reference signal (DMRS) and is sent over the first set of frequency resources, and wherein a subsequent repetition of the k repetitions that is sent using the first set of frequency resources omits the DMRS.

11. The apparatus of claim 10, the receiving the k repetitions of the transmission over the PUSCH comprising:
   receiving a third repetition over the PUSCH, following the second repetition and starting from a third symbol within the first slot, wherein a portion of the third repetition is received within a second slot following the first slot.

12. The apparatus of claim 10, wherein the first starting RB and the second starting RB meet:

$$RB_{start}(n) = \begin{cases} RB_{start} & (n \bmod 2) = 0 \\ (RB_{start} + RB_{offset}) \bmod N_{BWP}^{size} & (n \bmod 2) = 1 \end{cases}$$

wherein $RB_{start}(n)$ represents a starting RB of a repetition associated with n, $RB_{start}$ represents the first starting RB, $(RB_{start}+RB_{offset}) \bmod N_{BWP}^{size}$ represents the second starting RB, and $RB_{offset}$ is an offset configured by higher layer signaling, and $N_{BWP}^{size}$ is the size of a BWP.

13. The method of claim 1, wherein the first starting RB and the second starting RB meet:

$$RB_{start}(n) = \begin{cases} RB_{start} & (n \bmod 2) = 0 \\ (RB_{start} + RB_{offset}) \bmod N_{BWP}^{size} & (n \bmod 2) = 1 \end{cases}$$

wherein $RB_{start}(n)$ represents a starting RB of a repetition associated with n, $RB_{start}$ represents the first starting RB, $(RB_{start}+RB_{offset}) \bmod N_{BWP}^{size}$ represents the second starting RB, and RB offset is an offset configured by higher layer signaling, and $N_{BWP}^{size}$ is the size of a BWP.

14. The apparatus of claim 4, wherein the first starting RB and the second starting RB meet:

$$RB_{start}(n) = \begin{cases} RB_{start} & (n \bmod 2) = 0 \\ (RB_{start} + RB_{offset}) \bmod N_{BWP}^{size} & (n \bmod 2) = 1 \end{cases}$$

wherein $RB_{start}(n)$ represents a starting RB of a repetition associated with n, $RB_{start}$ represents the first starting RB, $(RB_{start}+RB_{offset}) \bmod N_{BWP}^{size}$ represents the second starting RB, and $RB_{offset}$ is an offset configured by higher layer signaling, and $N_{BWP}^{size}$ is the size of a BWP.

15. The method of claim 1, wherein all subsequent repetitions of the k repetitions that are sent using the first set of frequency resources omit the DMRS.

16. The method of claim 1, wherein an immediate subsequent repetition of the k repetitions that is sent using the first set of frequency resources omits the DMRS.

17. The method of claim 1, wherein the second repetition is front-loaded with the DMRS and is sent over the second set of frequency resources, and wherein a second subsequent repetition of the k repetitions that is sent using the second set of frequency resources omits the DMRS.

\* \* \* \* \*

UNITED STATES PATENT AND TRADEMARK OFFICE
CERTIFICATE OF CORRECTION

PATENT NO. : 11,791,951 B2
APPLICATION NO. : 16/533036
DATED : October 17, 2023
INVENTOR(S) : Vilaipornsawai et al.

It is certified that error appears in the above-identified patent and that said Letters Patent is hereby corrected as shown below:

In the Claims

In Column 32, in Claim 13, Line 29, delete "RB offset" and insert -- $RB_{offset}$ --.

Signed and Sealed this
Twenty-sixth Day of December, 2023

Katherine Kelly Vidal
*Director of the United States Patent and Trademark Office*